US012330442B2

(12) United States Patent
Harris et al.

(10) Patent No.: US 12,330,442 B2
(45) Date of Patent: Jun. 17, 2025

(54) CARD ATTACHMENT SYSTEM AND METHOD

(71) Applicant: FISERV, INC., Brookfield, WI (US)

(72) Inventors: Joel Harris, Missouri Valley, IA (US); Ray Stuck, Omaha, NE (US); Jon Gates, Honey Creek, IA (US); Corey Dean Tunink, Blair, NE (US); Jay E. Greene, III, Bellevue, NE (US)

(73) Assignee: FISERV, INC., Milwaukee, WI (US)

( * ) Notice: Subject to any disclaimer, the term of this patent is extended or adjusted under 35 U.S.C. 154(b) by 308 days.

(21) Appl. No.: 17/951,417

(22) Filed: Sep. 23, 2022

(65) Prior Publication Data

US 2024/0100876 A1 Mar. 28, 2024

(51) Int. Cl.
*B65H 43/00* (2006.01)
*B42F 5/00* (2006.01)
*B65H 45/30* (2006.01)

(52) U.S. Cl.
CPC ............... *B42F 5/00* (2013.01); *B65H 43/00* (2013.01); *B65H 45/30* (2013.01); *B65H 2301/431* (2013.01); *B65H 2511/20* (2013.01)

(58) Field of Classification Search
CPC ........... B42F 5/00; B65H 43/00; B65H 45/30; B65H 2301/431; B65H 2511/20
USPC ........................................................ 156/227
See application file for complete search history.

(56) References Cited

U.S. PATENT DOCUMENTS 8,166,733 B2 * 5/2012 Abell .................. B42D 15/045 53/133.1
2010/0179680 A1 7/2010 Prataiola

FOREIGN PATENT DOCUMENTS

WO WO-2007/119091 10/2007

OTHER PUBLICATIONS

Foreign Search Report on PCT/US2023/033107 DTD Feb. 21, 2024.

* cited by examiner

*Primary Examiner* — James D Sells
(74) *Attorney, Agent, or Firm* — FOLEY & LARDNER LLP

(57) ABSTRACT

A system may include a folding apparatus configured to fold a card carrier for affixing a transaction card to the card carrier and a processor which can receive a first input from a user regarding a number of folds desired in the card carrier and a location of the folds on the card carrier, receive a second input regarding one or more directions of the folds to be made on the card carrier, and transmit a signal to a positioner motor configured to position the card carrier based on the first input and the second input such that the folding apparatus folds the card carrier according to the first input and the second input.

20 Claims, 13 Drawing Sheets

CARD ATTACHMENT SYSTEM AND METHOD

BACKGROUND

Cards such as transaction cards and other objects may be attached to personalized mailings, where the card or other objects are personalized according to the intended recipient. Cards and other objects may be attached to mailings using glue, tape, or other adhesive. This can be a labor-intensive, time-consuming process.

SUMMARY

Aspects of the present invention are directed to a system including a folding apparatus configured to fold a card carrier for affixing a transaction card to the card carrier, and one or more non-transitory computer-readable media including computer-readable instructions stored thereon which, when executed by the one or more processors of the system, cause the one or more processors to receive a first input from a user regarding a number of folds desired in the card carrier and a location of the folds on the card carrier, receive a second input regarding one or more directions of the folds to be made on the card carrier, and transmit a signal to a positioner motor configured to position the card carrier based on the first input and the second input such that the folding apparatus folds the card carrier according to the first input and the second input.

In some aspects, the card carrier is scored in a location where the folds on the card carrier are to be made.

In some aspects, the card carrier is a booklet, and the positioner motor is further configured to position the card carrier such that the folding apparatus does not fold the card carrier.

In some aspects, a second folding apparatus makes one or more folds in the card carrier before the transaction card is attached to the card carrier.

In some aspects, the second folding apparatus makes the one or more folds in the card carrier equal to the number of folds desired in the card carrier minus one, and where the folding apparatus makes a final fold in the card carrier.

Some aspects include one or more sensors configured to determine a position of the card carrier and an identifier of the card carrier.

In some aspects, positioning the card carrier based on the first input and the second input includes verifying a position of the card carrier using the one or more sensors.

Some aspects include a conveyor configured to transport the card carrier that has been folded by the folding apparatus to a gantry for affixing the transaction card to the card carrier, where the gantry includes an arm that affixes the transaction card to the card carrier as the card carrier moves on the conveyor.

In some aspects, the gantry is configured to move the arm in a first direction that is perpendicular to a direction of movement of the card carrier on the conveyor and a second direction that is perpendicular to the first direction and the direction of movement of the card carrier on the conveyor to affix the transaction card to the card carrier.

In some aspects, the gantry is further configured to rotate the arm in a third direction that is perpendicular to the first direction and the second direction to affix the transaction card to the card carrier.

In some aspects, the card carrier includes one of a paper, a booklet, or a box product.

In some aspects, the transaction card includes one of a credit card, a debit card, or a gift card.

Aspects of the present invention are directed to a non-transitory, computer-readable medium including instructions which, when executed by a processor, cause the processor to receive a first input from a user regarding a number of folds desired in a card carrier and a location of folds on the card carrier, receive a second input regarding one or more directions of the folds to be made on the card carrier, and transmit a signal to a positioner motor configured to position the card carrier based on the first input and the second input such that a folding apparatus folds the card carrier according to the first input and the second input.

The non-transitory, computer-readable medium of claim 13, wherein the instructions further cause the one or more processors to transmit a signal to a second folding apparatus to make one or more folds in the card carrier equal to the number of folds desired in the card carrier minus one before the transaction card is attached to the card carrier, and wherein the folding apparatus makes a final fold in the card carrier.

In some aspects, the instructions further cause the one or more processors to receive, from one or more sensors, a position of the card carrier and an identifier of the card carrier and modify the signal transmitted to the positioner motor based on verifying a position of the card carrier using the received position of the card carrier.

In some aspects, the instructions further cause the one or more processors to actuate a conveyor configured to transport the card carrier that has been folded by the folding apparatus to a gantry for affixing the transaction card to the card carrier, wherein the gantry comprises an arm that affixes the transaction card to the card carrier as the card carrier moves on the conveyor, and move the arm in a first direction that is perpendicular to a direction of movement of the card carrier on the conveyor and a second direction that is perpendicular to the first direction and the direction of movement of the card carrier on the conveyor to affix the transaction card to the card carrier, wherein the instructions further cause the one or more processors to rotate the arm in a third direction that is perpendicular to the first direction and the second direction to affix the transaction card to the card carrier.

Aspects of the present invention are directed to a method including receiving a first input from a user regarding a number of folds desired in a card carrier and a location of folds on the card carrier, receiving a second input regarding one or more directions of the folds to be made on the card carrier, and transmitting a signal to a positioner motor configured to position the card carrier based on the first input and the second input such that a folding apparatus folds the card carrier according to the first input and the second input.

In some aspects, the method includes transmitting a signal to a second folding apparatus to make one or more folds in the card carrier equal to the number of folds desired in the card carrier minus one before the transaction card is attached to the card carrier, wherein the folding apparatus makes a final fold in the card carrier.

In some aspects, the method includes receiving, from one or more sensors, a position of the card carrier and an identifier of the card carrier and modifying the signal transmitted to the positioner motor based on verifying a position of the card carrier using the received position of the card carrier.

In some aspects, the method may include actuating a conveyor configured to transport the card carrier that has been folded by the folding apparatus to a gantry for affixing the transaction card to the card carrier, wherein the gantry comprises an arm that affixes the transaction card to the card carrier as the card carrier moves on the conveyor, moving the arm in a first direction that is perpendicular to a direction of movement of the card carrier on the conveyor and a second direction that is perpendicular to the first direction and the direction of movement of the card carrier on the conveyor to affix the transaction card to the card carrier, and rotating the arm in a third direction that is perpendicular to the first direction and the second direction to affix the transaction card to the card carrier in a desired orientation.

Figure 1:
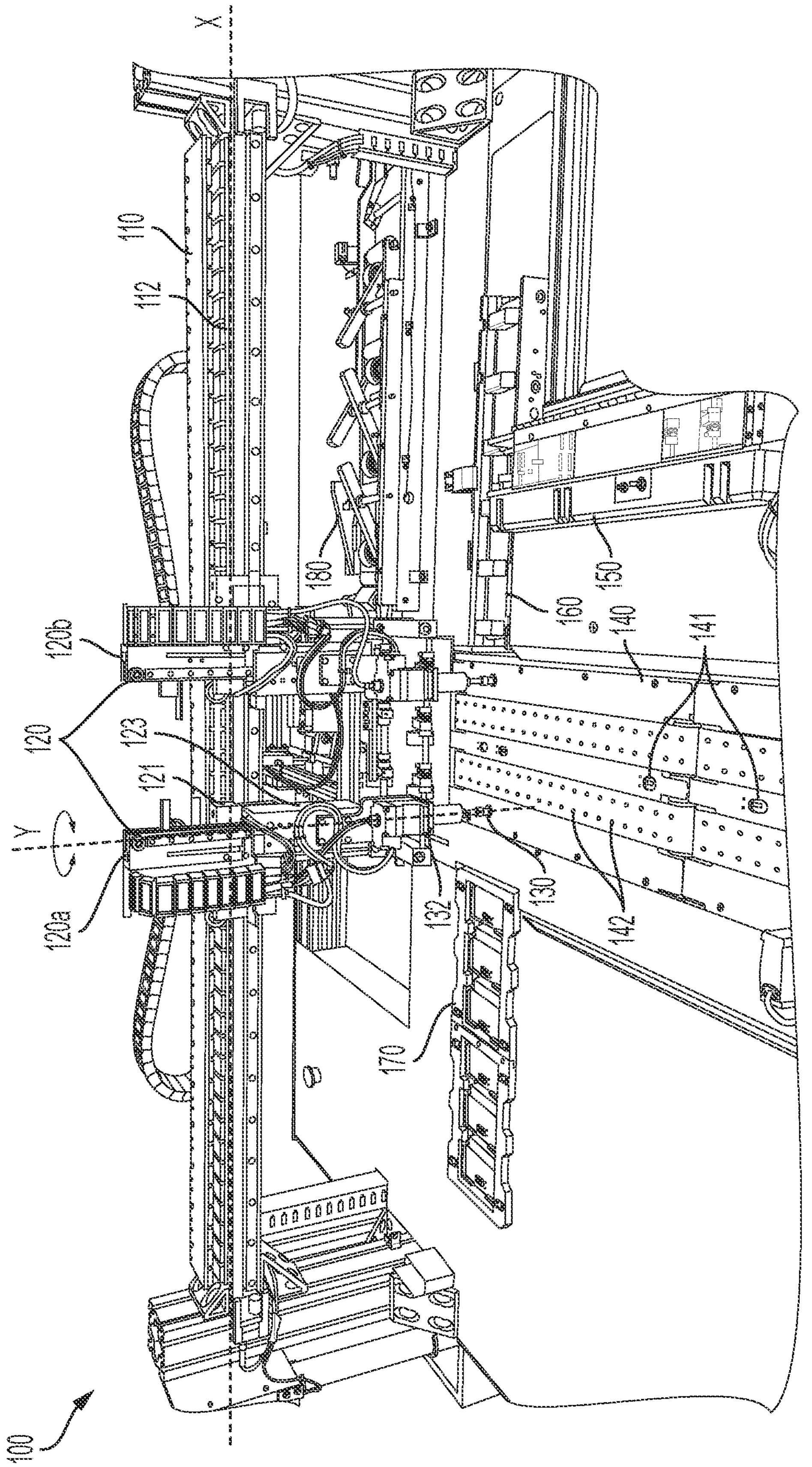
FIG. 1 is a perspective view of an example card attachment system for attaching a card to a card carrier, in accordance with one or more embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is directed to a card attachment system that is configured to attach a card (e.g., a transaction card such as a credit card) to a card carrier (e.g., paper). The card attachment system disclosed herein provides several technical solutions and improvements over conventional systems. For example, the card attachment system includes a gantry having at least two arms configured to attach at least two cards to at least two carriers simultaneously, providing the technical improvement of shortened attachment times. The at least two arms can move simultaneously and independently to retrieve cards from a stager of the card attachment system and attach the cards to carriers. The at least two arms can attach two or more cards to the same carrier or to subsequent carriers. The use of the multiple arms significantly shortens an attachment time for cards. The stager can also position cards to reduce a time necessary for the multiple arms to retrieve the cards and attach them to carriers. The use of the stager also significantly shortens the attachment time for cards.

The card attachment system also solves the technical problem of how to precisely place the cards in desired locations and orientations on the carriers. The multiple arms of the card attachment system each include multiple motors which allow the multiple arms to move horizontally, perpendicular to a direction of travel of the carriers, and vertically, towards and away from the carriers. Each arm of the multiple arms also includes a motor which allows the arm to rotate the cards through 360° to precisely orient the cards on the carriers. These multiple motors of the multiple arms solve the technical problem of how to precisely place the cards in desired locations and orientations on the carriers. Each arm is configured to position the card to the card carrier in any orientation independent from the other arm(s).

FIG. 1 is a perspective view of an example card attachment system for attaching a card to a card carrier, in accordance with one or more embodiments. The card attachment system 100 may include a gantry 110 including one or more arms 120 attached to the gantry. The one or more arms 120 may include a first arm 120*a* and a second arm 120*b*. The first arm 120*a* and the second arm120*b* may be identical or symmetrical to one another. Features discussed herein relative to the first arm 120*a* apply to the second arm 120*b*. The first arm 120*a* may include one or more motors which enable the first arm 120*a* to move along multiple axes. The first arm 120*a* may include a first motor 121 configured to move the first arm 120*a* along a horizontal axis X. The first arm 120*a* may be configured to move along the horizontal axis X along a rail 112 of the gantry 110. The first arm 120*a* may include a second motor 123 configured to move the first arm along the vertical axis Y. In some embodiments, the one or more arms 120 may include more than two arms.

The first arm 120*a* may include a cup 130 configured to apply suction to the card (not shown in FIG. 1). For example, the first arm 120*a* may include a venturi configured to provide suction to the cup 130 to pick up the card. Each arm may include a rotation motor 132 configured to rotate the cup 130 about the vertical axis Y. The rotation motor 132 may be configured to rotate the cup 130 to an orientation accurate to within 5°. The rotation motor 132 may be configured to rotate the cup 130 to any rotational orientation. The rotation motor 132 may include an encoder configured to track rotation of the cup 130. The card may be a transaction card such as a credit card, a debit card, a gift card, a health care card, a payroll debit\credit card, a gift card or any personalized or non-personalized type of transactional card, a wearable device that may or may not be personalized, or any other planular object. In some embodiments, the card may be a non-personalized device merged with a personalized device or other RF device such as a wearable transaction device.

The card attachment system 100 may include a conveyor 140 along which card carriers travel towards the gantry 110. The conveyor 140 may move the card carriers along the conveyor 140. The conveyor 140 may include one or more holes 142. One or more fans below the conveyor 140 may generate a pressure differential configured to suction the card carriers to the conveyor 140 as the card carriers are moved by the conveyor 140. The conveyor 140 may include one or more sensors 141 configured to determine carrier identifiers of the card carriers as the card carriers move along the conveyor 140. A carrier identifier may be a unique identifier of the card carrier which allows a controller to identify the card carrier and track the card carrier as it is moved by the conveyor 140. Examples of card carriers include papers, booklets, or box products. The card carriers may be any product configured to receive the card or other instrument. The card carrier may be configured to receive the card.

A card reader 150 of the card attachment system 100 may be configured to determine card identifiers of cards. The card reader 150 may be configured to move the card to a stager 160. The stager 160 may include a plurality of compartments, where each compartment is configured to hold a card such that the cup 130 of an arm of the one or more arms 120 can pick up the card and place the card on the card carrier. Each compartment may be configured to receive one card, where the card has a predetermined configuration. For example, in some embodiments, each compartment may be configured to receive a rectangular card, where a long end of the card is parallel to a first end of the compartment, the card is face up, and a writing on the card is right-side up relative to the first end of the compartment. The stager 160 may be configured to move the plurality of compartments such that the card reader 150 delivers the card to a particular compartment of the plurality of compartments.

The card attachment system 100 may contain one or more soft reject areas 170. The one or more soft reject areas 170 may be configured to receive one or more cards. The one or more arms 120 may place a rejected card in the one or more soft reject areas 170 if the rejected card does not match a current card carrier, as discussed in greater detail below. The one or more arms 120 may retrieve the rejected card from the one or more soft reject areas 170 when the card matches the current card carrier. The one or more soft reject areas 170 may include one or more sensors for identifying cards.

Figure 6:
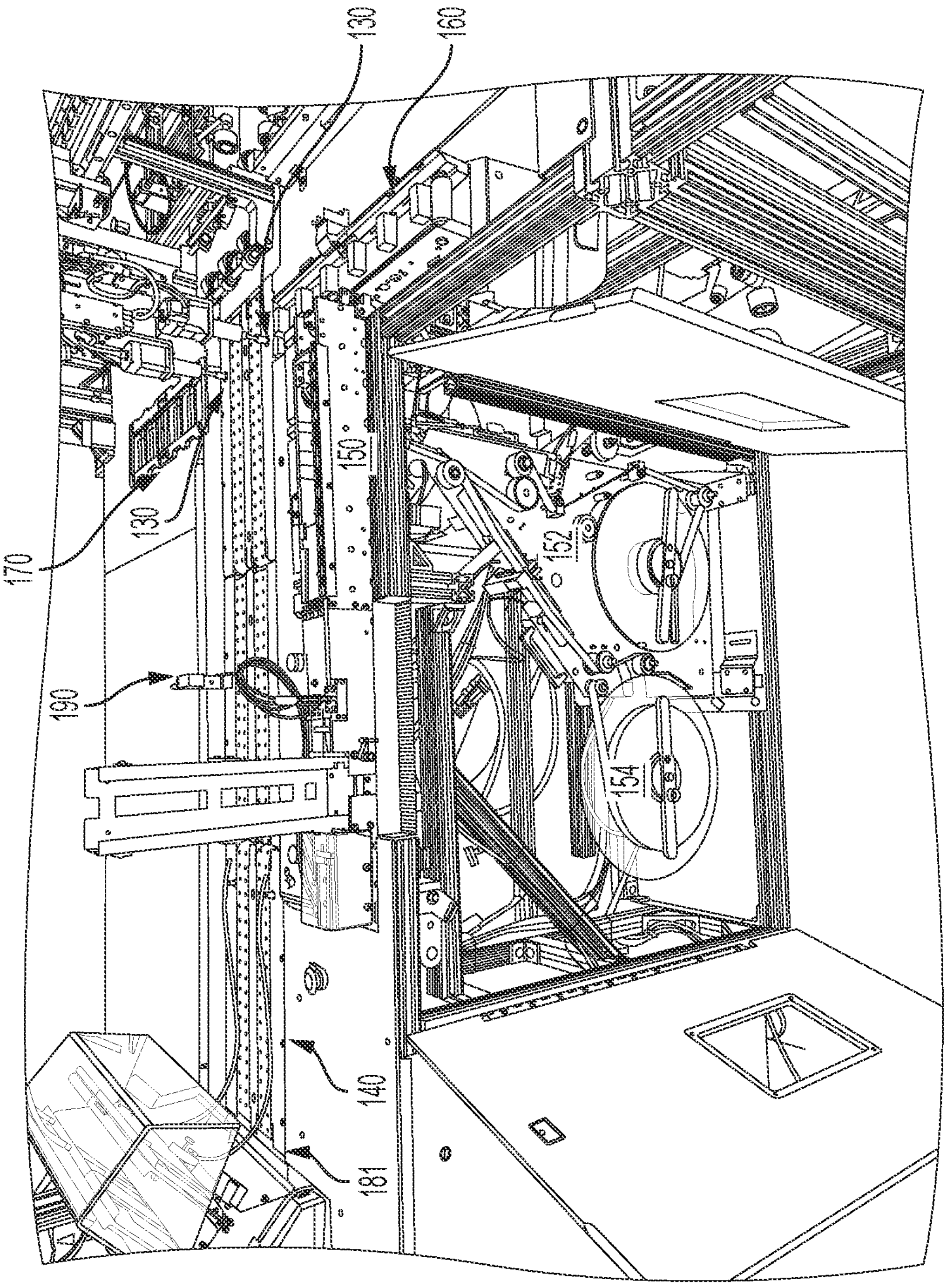
FIG. 6 is an example taper configured to apply adhesive to cards for attachment in the card attachment system of FIG. 1, in accordance with one or more embodiments.

The card attachment system 100 may include a folder 180 configured to fold the card carriers. The folder 180 may also be called a folding apparatus or a first folding apparatus. In some embodiments, the folder 180 may be a plow folder. The folder 180 may be configured to fold a card carrier after one or more cards have been attached to the card carrier. The folder may be configured to fold the card carrier based on one or more inputs including a desired location on the card carrier where the card is to be affixed, a desired orientation of the card on the card carrier, a number of folds on the card carrier, and one or more fold locations on the card carrier. In other embodiments, other inputs may be used. In some embodiments, the card carrier is scored in the one or more fold locations to make the fold. The card attachment system 100 may include a second folder, as shown in FIG. 6 configured to fold the card carrier before the one or more cards have been attached to the card carrier. The folder and the second folder may be associated with one another. The folder and the second folder may be associated with one another as part of the card attachment system 100. The second folder may make one or more folds in the card carrier equal to the number of folds desired in the card carrier minus one and the folder may make a final fold in the card carrier.

In some embodiments, the folder 180 may be configured to make a single fold in the card carrier based on a position and orientation of the card carrier as the card carrier enters the folder 180. The position and/or orientation of the card carrier as the card carrier enters the folder is controlled by a positioner, as discussed in conjunction with FIG. 7.

Figure 2:
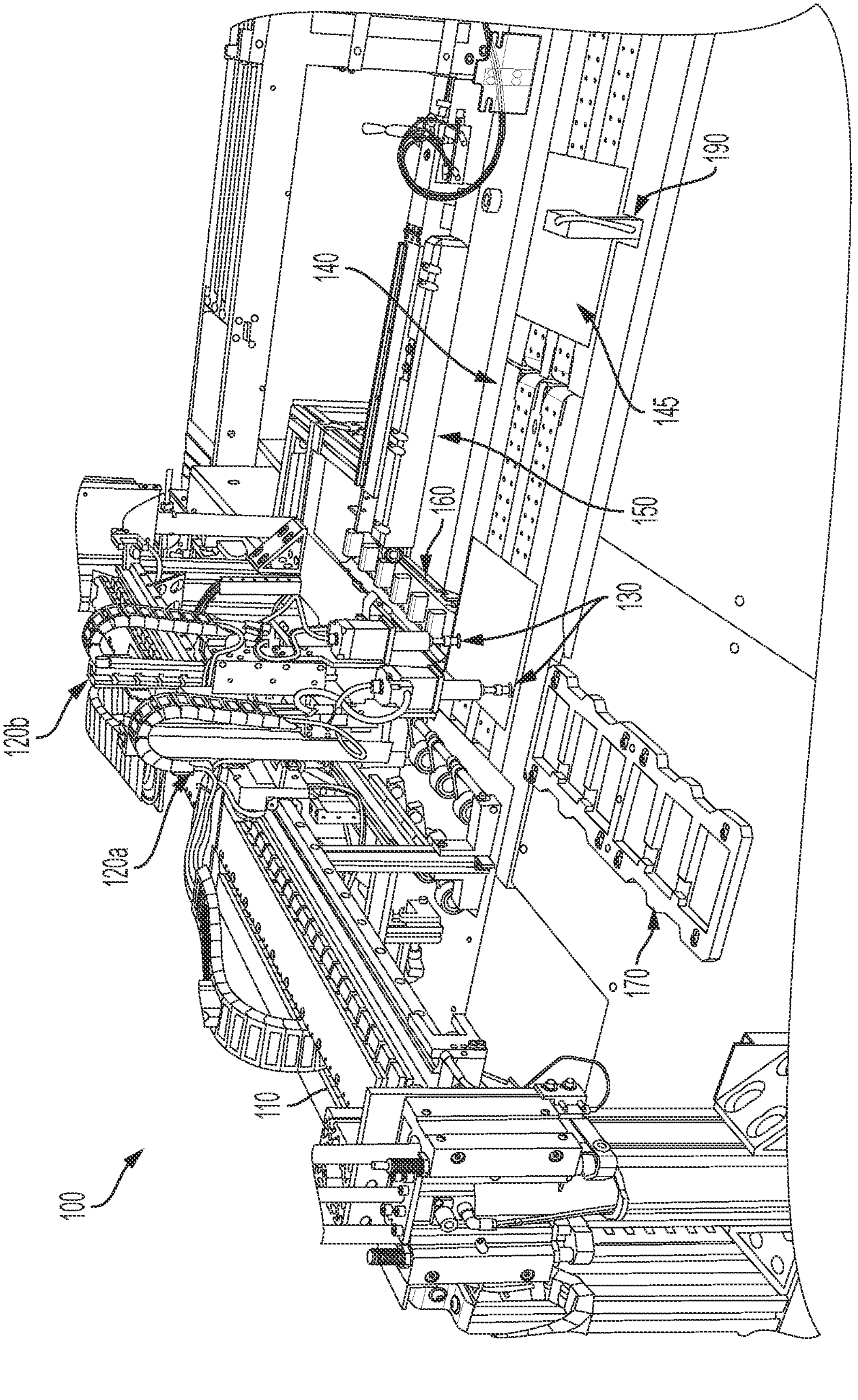
FIG. 2 is another perspective view of the example card attachment system of FIG. 1, in accordance with one or more embodiments.

FIG. 2 is a side perspective view of the example card attachment system 100 of FIG. 1. The card attachment system 100 may include a position sensor 190. The position sensor 190 may be configured to sense a position of the card carrier 145 on the conveyor 140. The position sensor 190 may be configured to sense an edge of the card carrier 145 to determine a lateral displacement of the card carrier 145 on the conveyor 140. The lateral displacement is a measure of displacement along a horizontal axis orthogonal to the direction of movement of the card carrier 145 along the conveyor 140. The position sensor 190 may determine a rotation of the card carrier 145 on the conveyor 140. The one or more arms 120 may adjust their movement to account for the lateral displacement and/or the rotation of the card carrier 145. The one or more arms 120 may adjust their movement based on the lateral displacement from the position sensor 190 to place the card in the desired location and orientation on the card carrier. In some embodiments, the position sensor 190 may be an edge sensor. The position sensor 190 provides continuous feedback to the gantry 110 of a card carrier position on the conveyor 140 to compensate for card carrier position movement left or right on the conveyor 140 and adjusts a card placement based on this feedback to maintain consistent card placement on each card carrier.

The card reader 150 of the card attachment system 100 may be configured to determine a card identifier and deliver the card to the stager 160. The card identifier may be a unique identifier which allows a controller (not shown) to identify the card and track the card. In some embodiments, the card reader 150 may determine the card identifier by scanning a magnetic strip of the card. In other embodiments, the card reader 150 may determine the card identifier by optically sensing words on the card. In yet other embodiments, the card reader 150 may determine the card identifier by sensing a near-field communication (NFC) chip of the card.

The stager 160 may include a plurality of compartments for receiving the card. The stager 160 may select a compartment of the plurality of compartments for receiving the card based on where the card is to be attached to the card carrier 145, how many cards are to be attached to the card carrier 145, a current position of the one or more arms 120, and/or a future position of the one or more arms 120. In some embodiments, the plurality of compartments may be positioned on a belt and defined by barriers on the belt. The stager 160 may select a compartment of the plurality of compartments by moving the belt such that the compartment is located adjacent the card reader 150 as the card is dispensed from the card reader 150. For example, in some embodiments, the stager 160 may receive a card in a compartment located to the right of the center of the stager 160 as viewed from the card reader 150 if a second card is to be attached to the card carrier 145 along with the card. The second card may be received by the stager 160 in a compartment located to the left of the center of the stager 160 such that a first arm and a second arm of the one or more arms 120 do not collide or otherwise interfere with one another as the first arm picks up the card and the second arm picks up the second card. In some embodiments, more than two cards may be placed on the card carrier. Any number of cards may be placed on the card carrier up to a capacity of the card carrier. In another example, the stager 160 may place successive cards in adjacent compartments such that several cards are available to the one or more arms. Placing cards in various compartments of the stager 160 to accommodate movement of the one or more arms 120 may reduce a number of movements of the one or more arms 120 required for picking up the card or cards. Reducing the number of movements required for picking up the card or cards may result in faster attachment times.

The cup 130 attached to each arm of the one or more arms may be configured to apply suction to the card to pick up the card from the stager. A level of suction or pressure may be used to determine when the card has been picked up. Each arm of the one or more arms 120 may be calibrated to a height of the card in the stager 160 by pressing the cup 130 into one or more compartments of the stager 160. Each arm of the one or more arms 120 may be calibrated to a height of the card carrier 145 on the conveyor 140 by pressing the cup 130 into the conveyor 140.

The one or more arms 120 may attach the card to the card carrier 145 if the card identifier is associated with or matches the carrier identifier. If the card identifier is not associated with or does not match the carrier identifier, the one or more arms do not attach the card to the card carrier 145. If the card identifier is associated with a card carrier 145 which has not yet passed beneath the gantry 110, the one or more arms 120 may place the card in one or more soft reject areas 170. The one or more soft reject areas may be located adjacent the conveyor 140 and may include sensors configured to determine card identifiers of cards placed in the one or more soft reject areas 170. The one or more arms may retrieve the card from the one or more soft reject areas when the card carrier 145 associated with the card identifier approaches the gantry 110 and attach the card to the card carrier 145 associated with the card identifier. If the card identifier is associated with a card carrier 145 which has already passed beneath the gantry 110, the card may be placed by the stager 160 in a hard reject area. The hard reject area may be located on a side of the stager 160 away from the conveyor 140. In some embodiments, the hard reject area is inaccessible to the one or more arms 120 and cards in the hard reject area may be retrieved by an operator of the card attachment system 100.

Figure 3:
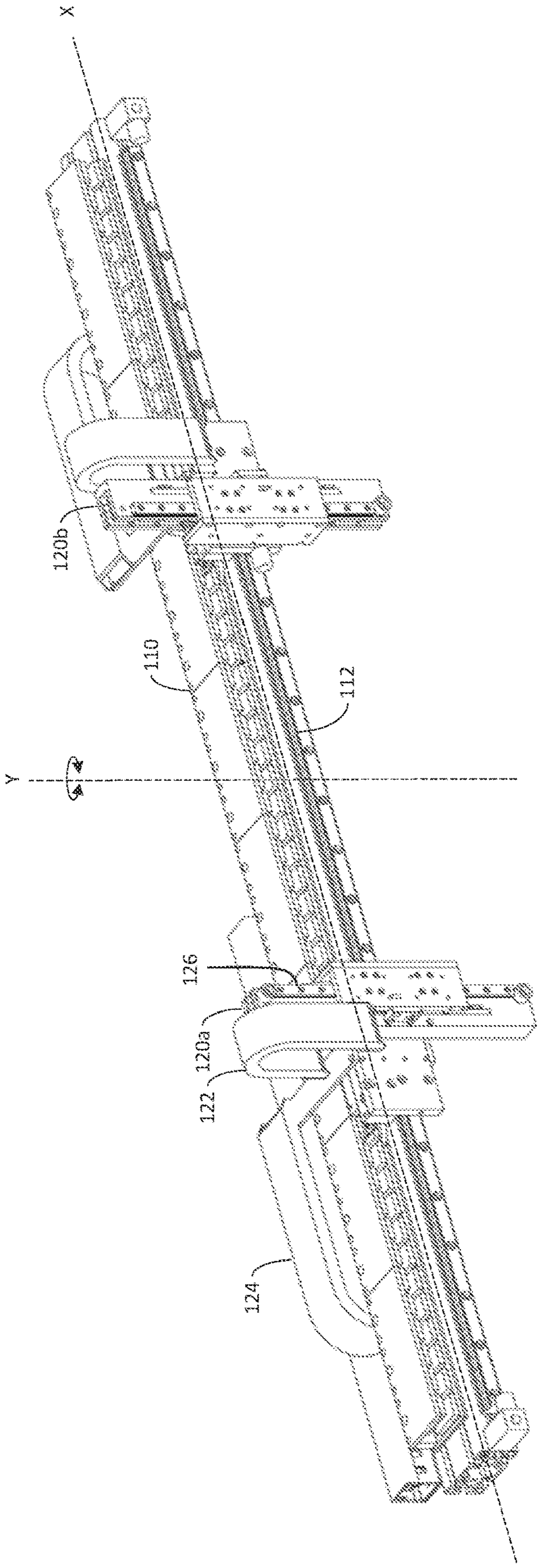
FIG. 3 is a perspective view of an example gantry of the example card attachment system of FIG. 1 that attaches the card to the card carrier, in accordance with one or more embodiments.
Figure 4:
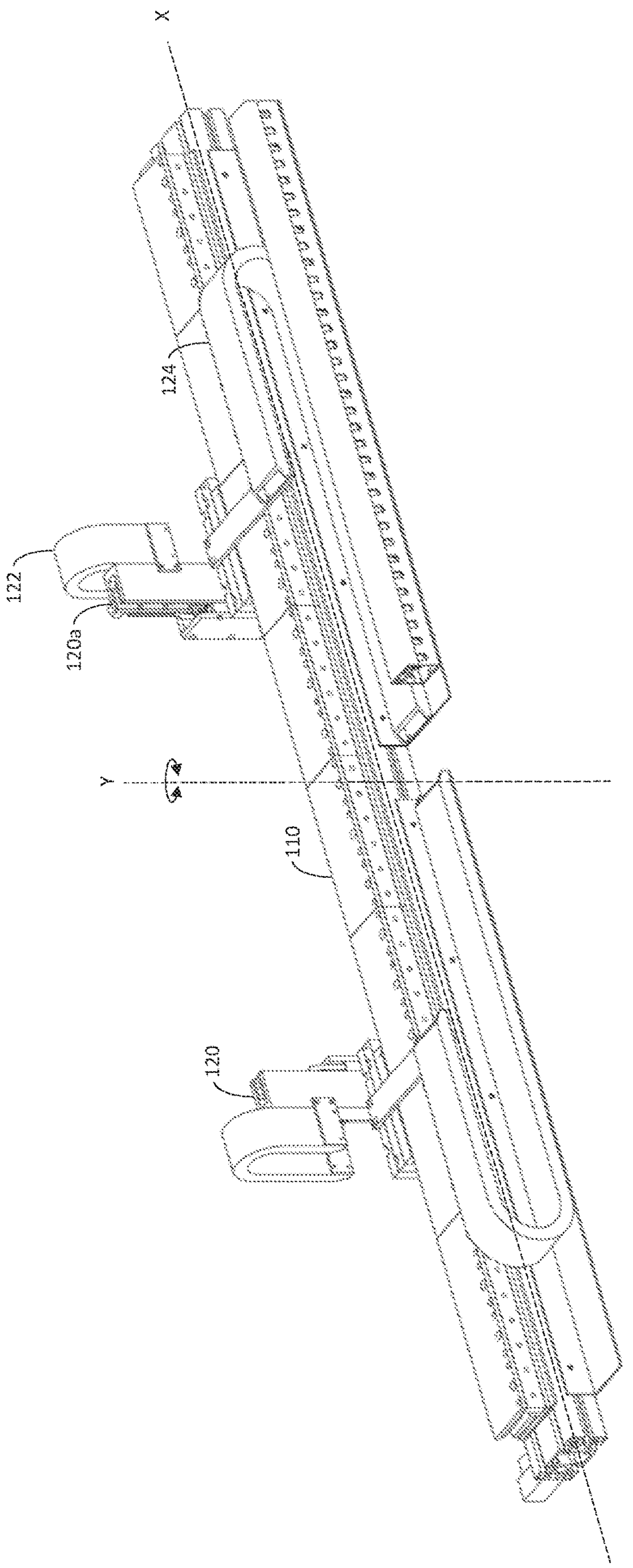
FIG. 4 is another perspective view of the example gantry of FIG. 3, in accordance with one or more embodiments.

FIGS. 3 and 4 are perspective views of the gantry 110 of FIG. 1 that attaches the card to the card carrier, in accordance with one or more embodiments. The gantry 110 may include the one or more arms 120. The one or more arms 120 may include the first arm 120*a* and the second arm 120*b*. The first arm 120*a* may include a wire track 122 configured to assist the second motor 123 of FIG. 1 move the first arm 120*a* along the vertical axis, Y. The first arm 120*a* may include a vertical rail 126 along which the components of the first arm 120*a* move when moving along the vertical axis Y. The vertical rail and vertical rigid belt actuator 122 may allow the first arm 120*a* to move along the vertical axis Y through a range of, for example, about thirteen inches in some embodiments. This range of vertical motion may allow the first arm 120*a* to attach instruments, such as credit cards, to various card carriers such as sheets of paper, booklets, and boxes. The first arm 120*a* may include a wire track 124 configured to assist the first motor 121 to move the first arm along the horizontal axis X. The horizontal rigid belt actuator 124 may include a motor configured to move the first arm along the horizontal axis along the rail 112. The one or more arms 120 may move along the rail 112 simultaneously. The rail 112 may be a common rail on which the one or more arms 120 move. In some embodiments, the one or more arms 120 include one or more sensors to prevent the one or more arms 120 from colliding with each other. In other embodiments, the gantry 110 may include one or more sensors to prevent the one or more arms 120 from colliding with each other. A controller may receive input from the one or more sensors and stop movement of at least a first arm or a second arm of the one or more arms upon the one or more sensors detecting that the first arm and the second arm are within a predetermined distance of one another. The one or more arms 120 may each arm include a rotation motor 132 (as shown in FIG. 1) configured to rotate the cup 130 about the vertical axis Y. The rotation motor 132 may be configured to rotate the cup 130 to an orientation accurate to within 5°. The rotation motor 132 may be configured to rotate the cup 130 to any rotational orientation. The rotation motor 132 may include an encoder configured to track rotation of the cup 130.

In some embodiments, the one or more arms 120 are configured to move independently of one another. In other embodiments, the one or more arms 120 may be configured to move in tandem. In yet other embodiments, the one or more arms 120 may be configured to be connected as they move together for stability. The one or more arms 120 may move simultaneously.

In some embodiments, the first arm 120*a* may be configured to affix a first instrument, such as a first transaction card, to the card carrier. The second arm 120*b* may be configured to affix a second instrument, such as a second transaction card, to the card carrier. The first arm 120*a* and the second arm 120*b* may move independently and simultaneously to pick up the first instrument and the second instrument and place them on the card carrier. The first arm 120*a* and the second arm 120*b* may place the first and second instruments on the card carrier in any orientations. In some embodiments, the first arm 120*a* and the second arm 120*b* may place the first instrument and the second instrument on separate card carriers. The first arm 120*a* may pick up the first instrument and attach the first instrument to a first card carrier. The second arm 120*b* may pick up the second instrument and attach the second instrument to the second card carrier. In some embodiments, the first arm 120*a* may attach the first instrument to the first card carrier in a first orientation and the second arm 120*b* may attach the first instrument to the second card carrier in a second orientation. The first arm 120*a* and the second arm 120*b* may attach the first instrument to the first card carrier in the first orientation and the second instrument to the second card carrier independent of one another.

Figure 5:
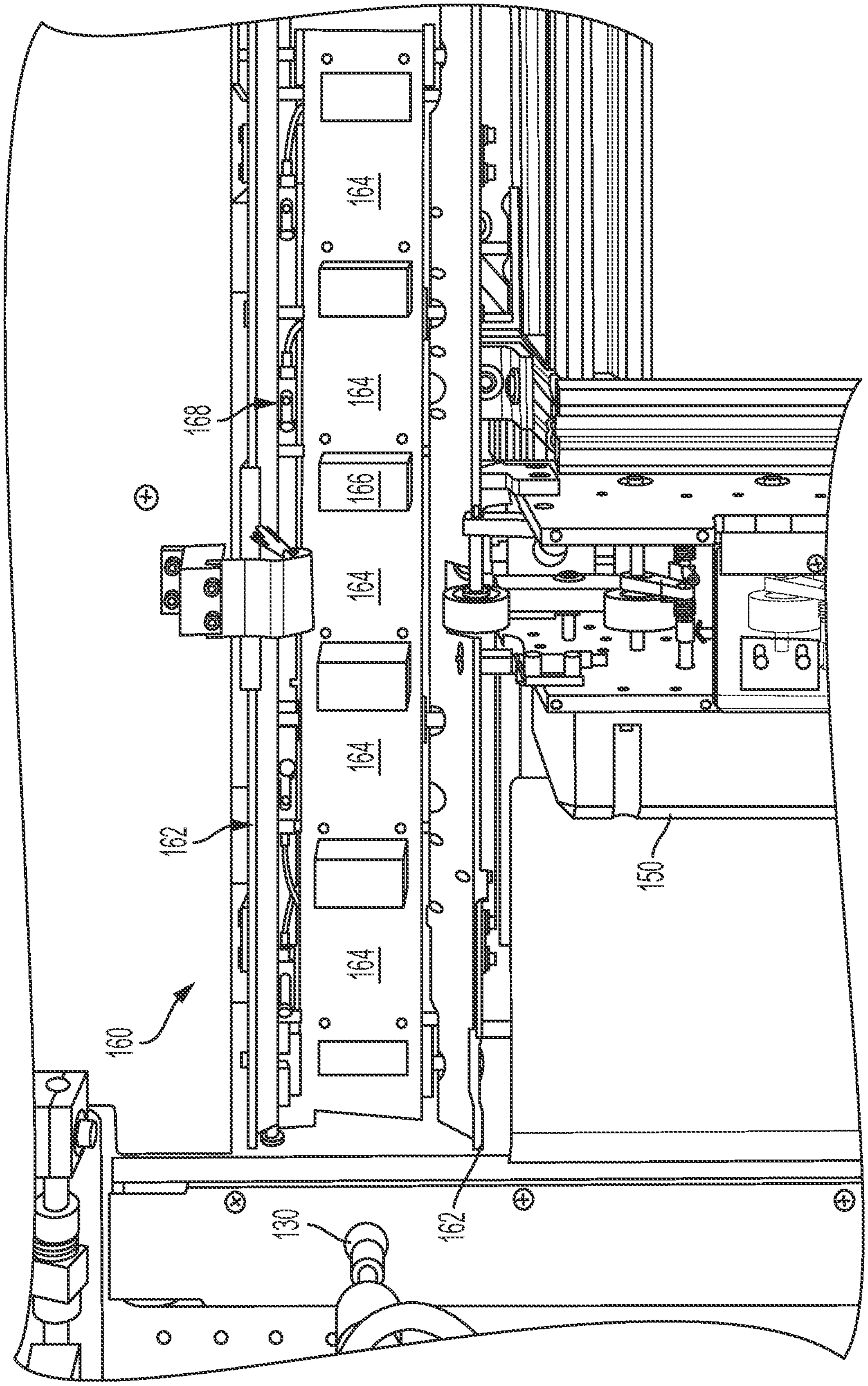
FIG. 5 is an example stager configured to position cards for attachment in the card attachment system of FIG. 1, in accordance with one or more embodiments.

FIG. 5 is an example of the stager 160 configured to position cards for attachment in the card attachment system 100 of FIG. 1, in accordance with one or more embodiments.

The stager 160 may include a plurality of compartments 164 separated by barriers 166. The number of compartments shown in FIG. 5 is merely an example number of compartments. In some embodiments, the stager 160 may include more or fewer compartments. Each of the plurality of compartments 164 may be configured to receive a card from the card reader 150. The card reader 150 may be stationary and the stager 160 may move such that the card reader places the card in a particular compartment of the plurality of compartments 164. The stager 160 may move such that the card is placed in the particular compartment based on where the card is to be attached to a card carrier 145, how many cards are to be attached to the card carrier 145, a current position of one or more arms 120, and/or a future position of the one or more arms 120, as discussed herein. The stager 160 may move such that a card in a compartment of the one or more compartments 164 moves out of the stager 160 into a hard reject area. For example, in some embodiments, the stager may move such that a compartment in which the card is located moves around an edge of a belt of the stager, dropping the card into the hard reject area.

The stager 160 may include two rails 162 on which the card rests while in the stager 160. The rails 162 may have a height lower than a height of the barriers 166 such that the barriers can push the card along the rails 162 as the stager 160 moves. The rails 162 may present a narrow surface area for contacting the card. The card may, in the stager 160, be in contact with only the rails 162 and the barriers 166, preventing marring or scratching of the card. In some embodiments, the card may include tape, glue, or another adhesive on a surface of the card. The tape, glue, or another adhesive may be on a center of the card such that the rails 162 do not contact the tape, glue, or another adhesive.

The stager 160 may include one or more sensors 168 configured to determine the card identifier to conveyor the card through the stager 160 and allow the cup 130 to pick up the card and attach it to the card carrier 145 associated with the card identifier. The cup 130 of the one or more arms may pick up the card using suction from the stager 160.

FIG. 6 is an example taper 152 configured to apply adhesive to cards for attachment in the card attachment system of FIG. 1, in accordance with one or more embodiments. The taper may include a tape roll 154. The taper 152 may be configured to apply tape, glue, or another adhesive to the card as the card passes through the card reader 150. The taper may apply the tape, glue, or another adhesive to a center of the card such that the tape, glue, or another adhesive does not contact the rails 162 of the stager 160 as discussed herein. The tape, glue, or another adhesive may bind the card to the card carrier. The adhesive may be applied to the card in any desired orientation. The second folder 181 may be configured to make one or more folds in the card carrier before the card is attached to the card carrier.

Figure 7:
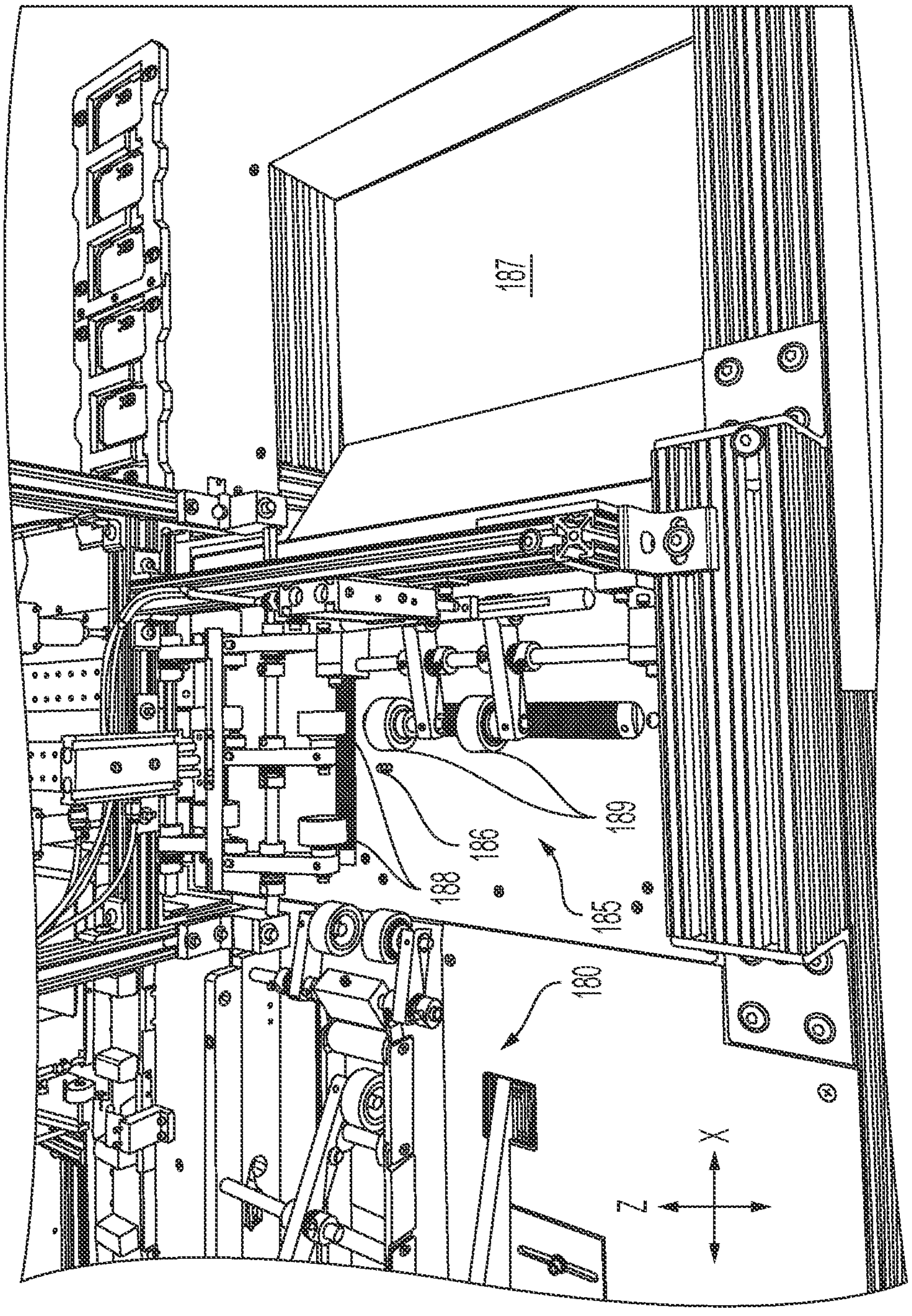
FIG. 7 is an example positioner configured to position carriers for folding in the card attachment system of FIG. 1, in accordance with one or more embodiments.

FIG. 7 is an example positioner 185 configured to position card carriers for folding in the card attachment system 100 of FIG. 1, in accordance with one or more embodiments. The positioner may include one or more sensors 186 configured to determine a carrier identifier. The positioner 185 may be configured to direct a card carrier to a reject bin 187 or a folder 180. The positioner 185 may include first rollers 188 and second rollers 189. The first rollers 188 may be configured to position the card carrier along a Z axis perpendicular to the X and Y axes of FIG. 1. The second rollers 189 may be configured to position the card carrier along an X axis corresponding to the X axis of FIG. 1. The first and second rollers 188 and 189 may contact the card carrier and move the card carrier in the X-Y plane, guided by feedback from the one or more sensors 186. The first and second rollers 188 and 189 may position the card carrier in the X-Y plane before the folder 180 such that the folder 180 makes one or more folds in the card carrier according to input describing a number of folds desired in the card carrier, a location of the folds on the card carrier, and one or more directions of the folds on the card carrier. In some embodiments, the first rollers 188 may position the card carrier according to the input and the second rollers 189 may feed the card carrier to the folder 180 such that the folder 180 makes one or more folds in the card carrier according to the input.

The positioner 185 may direct the card carrier to the reject bin 187 based on the card carrier not having an attached card. The card carrier may not have an attached card because a card associated with the card carrier was not attached to the card carrier. The associated card may have not been attached to the card carrier because the card carrier arrived at the gantry 110 of the card attachment system 100 before the card was placed in the stager 160 of the card attachment system 100. In some embodiments, the positioner 185 may direct the card carrier to the reject bin 187 based on one or more defects of the card carrier. For example, in some embodiments, the card carrier may be folded improperly and/or the card may be attached to the card carrier at a wrong location or in a wrong orientation. In another example, the card carrier may lack a card due to the required card not being available when the card carrier passed beneath the gantry, as discussed above. In some embodiments, the one or more sensors 186 are configured to detect the one or more defects of the card carrier. In other embodiments, other portions of the card attachment system 100 are configured to detect the one or more defects of the card carrier and transmit a signal to the positioner 185 to direct the card carrier to the reject bin 187. In some embodiments, if there is any known issue with a card carrier, reject bin 187 will be utilized to purge the card carrier from the system without stopping the card attachment system. Issues may include that the card carrier was detected by one of the one or more sensors 186 as blocked at the wrong time or that the card carrier present at the gantry 110 doesn't have any cards that match the card carrier. The software will purge the card carrier from the card attachment system using the reject bin 187 while continuing to process other card carriers.

The positioner 185 may be configured to direct the card carrier to the folder 180 such that the folder 180 folds the card carrier. The positioner 185 may be configured to direct the card carrier to the folder 180 such that the folder 180 folds the card carrier according to the input describing a number of folds desired in the card carrier, a location of the folds on the card carrier, and one or more directions of the folds on the card carrier. The positioner 185 may be configured to position the card carrier before the folder 180 according to the input before directing the card carrier to the folder 180 such that the folder 180 folds the card carrier according to the input. The positioner 185, may determine where the carrier will stop based on the input or a job profile. The positioner 185 may move the carrier to where the fold line or perforation is intended to be placed and feed the carrier into the folder 180 to create a final fold in the card carrier.

In some embodiments, the card carrier is scored in a location where the folds on the card carrier are to be made. The folds made by the folder 180 in the card carrier may follow scoring on the card carrier. In some embodiments, the one or more sensors 186 may be configured to determine a location of the scoring in the card carrier for positioning the card carrier. In other embodiments, the one or more sensors 186 may be configured to retrieve information pertaining to the scoring based on determining the carrier identifier of the card carrier.

In some embodiments, the card carrier is folded one or more times before reaching the positioner 185. The card carrier may be folded one or more times by the second folder before the card is attached to the folder. The folder 180 may add an additional fold or folds to the card carrier after the card is attached to the card carrier. For example, in some embodiments, the card carrier may require 3 folds, two of which are made before the card is attached to the card carrier. A final, third fold may be made by the folder 180 when the card carrier is directed to the folder 180 by the positioner 185. The positioner 185 may position the card carrier such that the folder 180 makes the third fold in a location specified by the input.

In some embodiments, the positioner is configured to direct the card carrier past the folder 180 such that the folder 180 does not fold the card carrier based on the card carrier not needing additional folds. In other embodiments, the positioner 185 is configured to direct the card carrier past the folder 180 such that the folder 180 does not fold the card carrier based on the card carrier being a booklet or a box product.

Figure 8:
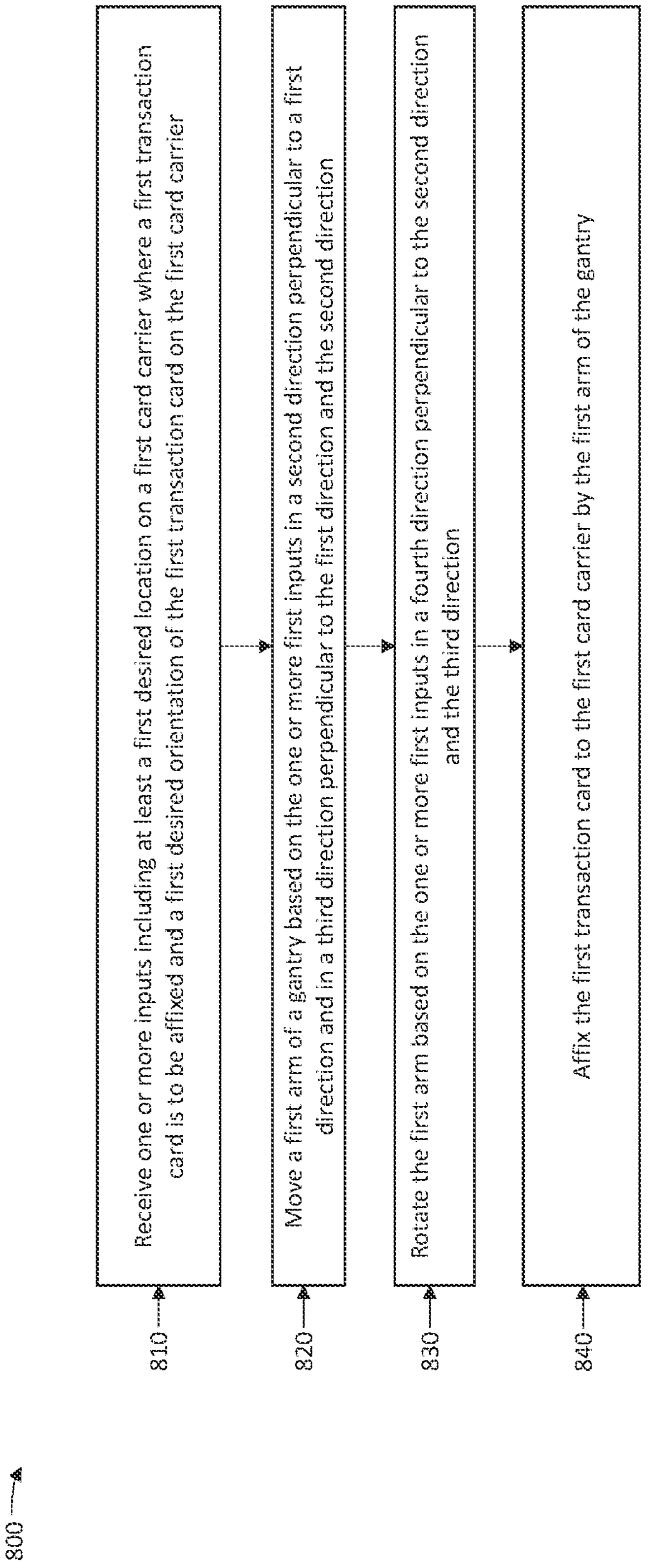
FIG. 8 is an example flowchart illustrating a process for attaching the card to the carrier using the one or more arms of the card attachment system of FIG. 1, in accordance with one or more embodiments.
Figure 13:
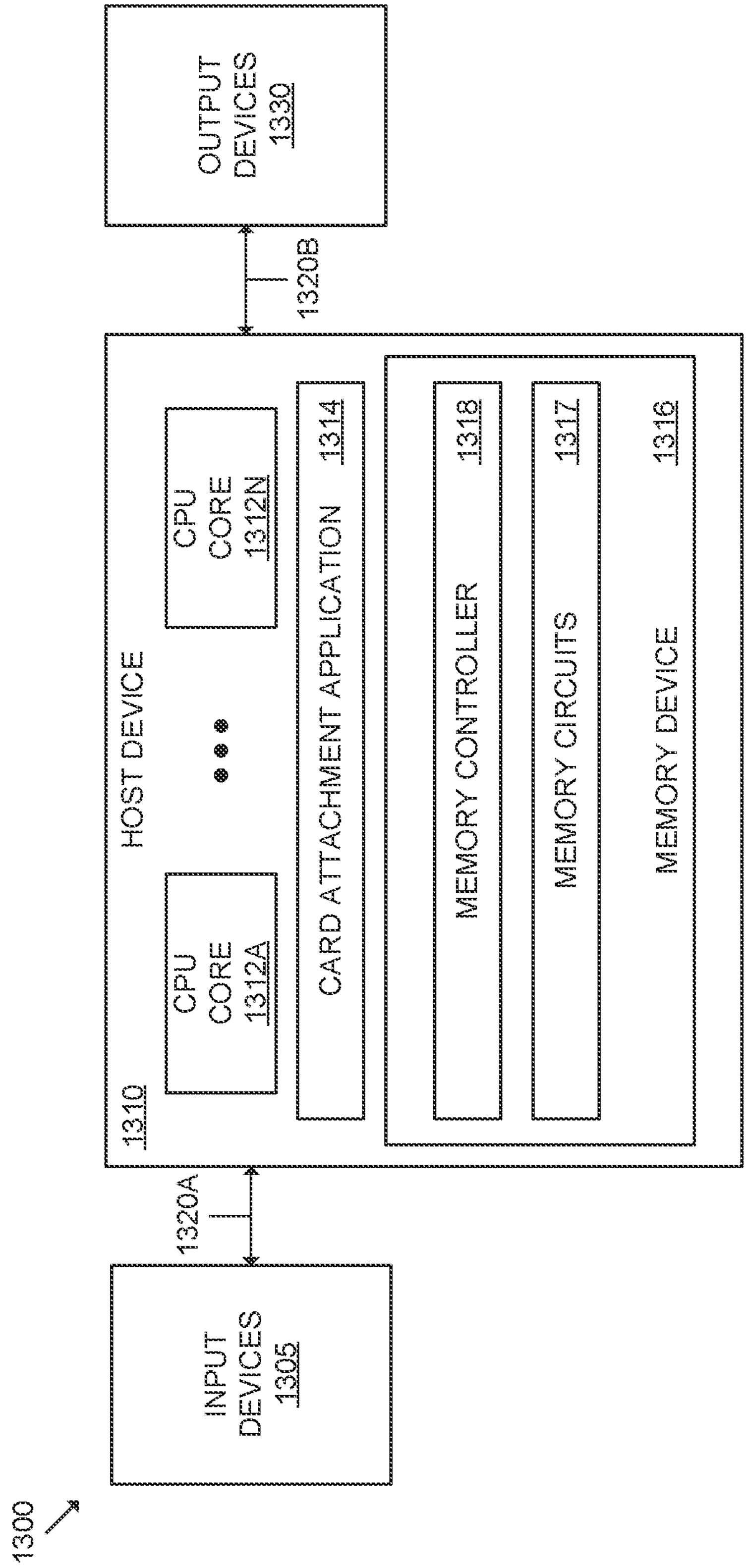
FIG. 13 is an example block diagram of a computing system implementing a card attachment application for the card attachment system of FIG. 1, in accordance with one or more embodiments.

FIG. 8 is an example flowchart illustrating a process 800 for attaching the card to the card carrier using the one or more arms 120 of the card attachment system 100 of FIG. 1. Additional, fewer, or different operations may be performed in the method, depending on the embodiment. Further, the operations may be performed in the order shown, concurrently, or in a different order. The operations illustrated in the process 800 may be performed by a controller of a card attachment system such as the card attachment system 100 described herein. An example of the controller is shown in FIG. 13.

At 810, the controller may receive one or more inputs including at least a first desired location on a first card carrier where a first transaction card is to be affixed and a first desired orientation of the first transaction card on the first card carrier. In some embodiments, the one or more inputs may be entered by a user. In other embodiments, the one or more inputs may be based on the card carrier. For example, in some embodiments, a card carrier may be a sheet of paper and may be associated with a first location and a first orientation of a transaction card and a card carrier which is a box product may be associated with a second location and a second orientation of a transaction card.

At 820, the controller may move the first arm 120*a* of the gantry 110 based on the one or more inputs in a second direction perpendicular to a first direction and in a third direction perpendicular to the first direction and the second direction. The second direction may be along the second axis X of FIG. 1 and the third direction may be along the first axis Y of FIG. 1. The first direction may be along an axis Z parallel to the direction the card carriers travel towards the gantry. The conveyor 140 of FIG. 1 may move the card carrier into position beneath the gantry. The conveyor 140 may move the card carrier to facilitate the placement of multiple cards on the card carrier. For example, the conveyor 140 may move the card carrier to a first position corresponding to the first desired location for attachment of the first transaction card and then move the card carrier to a second position corresponding to a second desired position of a second transaction card for attachment of the second transaction card. The first card carrier may be transported by the conveyor 140 in the first direction towards the gantry. The controller may move the first arm 120*a* of the gantry 110 so as to pick up the first transaction card and carry it to the first card carrier. For example, in some embodiments, the controller may move the first arm 120*a* along the gantry 110 in the second direction, along the second axis X of FIGS. 3 and 4, and down in the third direction, along the first axis Y of FIGS. 3 and 4, to pick up the first transaction card from a stager, such as the stager 160 of FIG. 1, and position the first transaction card on the first card carrier in the first location. The controller may move the first arm 120*a* by sending signals to motors of the gantry 110 and/or the first arm 120*a*. In some embodiments, the controller may move the first arm 120*a* and the second arm 120*b* simultaneously and/or independently. The controller may receive one or more second inputs including at least a second desired location on the first card carrier where a second transaction card is to be affixed and a second desired orientation of the second transaction card on the first card carrier. For example, in some embodiments, the one or more first inputs and the one or more second inputs may dictate that the first transaction card and the second transaction card be affixed side by side on the first card carrier.

At 830, the controller may rotate the first arm 120*a* based on the one or more first inputs in a fourth direction perpendicular to the second direction and the third direction. In some embodiments, the controller may rotate the first arm 120*a* about an axis parallel to the third direction. For example, in some embodiments, the first arm 120*a* may move up and down in the third direction and rotate about a vertical axis parallel to the third direction. The controller may rotate the first arm 120*a* to affix the first transaction card to the first carrier according to the one or more first inputs. For example, in some embodiments, the one or more first inputs may dictate that the first transaction card be affixed to the first card carrier such that a short end of the first transaction card is parallel to a long end of the first card carrier. The controller may rotate the second arm 120*b* based on the one or more second inputs to affix the second transaction card to the first card carrier according to the second desired orientation of the second transaction card on the first card carrier. For example, in some embodiments, the one or more second inputs may dictate that the second transaction card be affixed to the first card carrier parallel to the first transaction card.

In some embodiments, the controller is further configured to determine a position of one or more edges of the first card carrier as the first card carrier travels on the conveyor towards the gantry in the first direction. The controller may determine the position of the one or more edges of the first card carrier using an edge sensor such as the position sensor 190 of FIG. 2. The controller may calculate, based on the position of the one or more edges of the first card carrier, an offset indicating a difference between a default position of the first card carrier and the first desired location. The controller may calculate, based on the offset, a new location on the first card carrier to affix the first transaction card to the card carrier. The controller may move the first arm 120*a* of the gantry 110 based on the one or more first inputs in the second direction perpendicular to the first direction and in the third direction perpendicular to the first direction and the second direction by moving the first arm of the gantry based on the new location of the first card carrier to affix the first transaction card to the first card carrier in the first desired location and the first desired orientation. For example, in some embodiments, the default position of the first card carrier may be where the first card carrier is centered on the conveyor 140. The controller may determine that an edge of the first card carrier is shifted 3 mm left relative to the default position, meaning that the offset between the default position of the first card carrier and the first desired location is 3 mm left. The controller may calculate the new position of the first card carrier to be 3 mm to the left relative to the default position of the first card carrier. The controller may move and rotate the first arm 120*a* based on the one or more first inputs and the new position of the first card carrier to affix the first transaction card to the first card carrier in the first desired location and the first desire orientation.

At 840, the first transaction card is affixed to the first card carrier by the first arm 120*a* of the gantry 110. The controller may move and rotate the first arm 120*a* according to the one or more first inputs to affix the first transaction card to the first card carrier according to the one or more inputs. In some embodiments, the controller may move the first arm to pick up the first transaction card and hold it above the first card carrier and then move and rotate the first arm to affix the first transaction card to the first card carrier. The second transaction card may be affixed to the first card carrier by the second arm 120*b* of the gantry 110. The controller may move and rotate the second arm 120*b* according to the one or more second inputs to affix the second transaction card to the first card carrier according to the one or more inputs. In some embodiments, the controller may move the second arm 120*b* to pick up the second transaction card and hold it above the first card carrier and then move and rotate the second arm to affix the second transaction card to the first card carrier. In some embodiments, the one or more first inputs and the one or more second inputs may include at least one of a material of the first and/or second card carrier, a size of the first and/or second card carrier, a thickness of the first and/or second card carrier, or a type of the first and/or second card carrier. For example, in some embodiments, the thickness of the first and/or second card carrier may determine how far the controller moves the first and/or second arms down to affix the first and/or second transaction cards to the first and/or second card carriers. Similarly, the type of the first and/or second card carrier, such as a paper or a box product, may determine how far the controller moves the first arm 120*a* and/or second arm 120*b* down to affix the first and/or second transaction cards to the first card carrier.

In some embodiments, the operations of the process 800 may be performed with the first card carrier and a second card carrier such that the first transaction card is affixed to the first card carrier by the first arm and the second transaction card is affixed to the second card carrier by the second arm. The controller may move the first arm 120*a* and the second arm 120*b* simultaneously and/or independently. Sensors on the gantry 110 and/or the first arm 120*a* and second arm 120*b* may allow the controller to avoid collisions between the first arm 120*a* and the second arm 120*b*.

Figure 9:
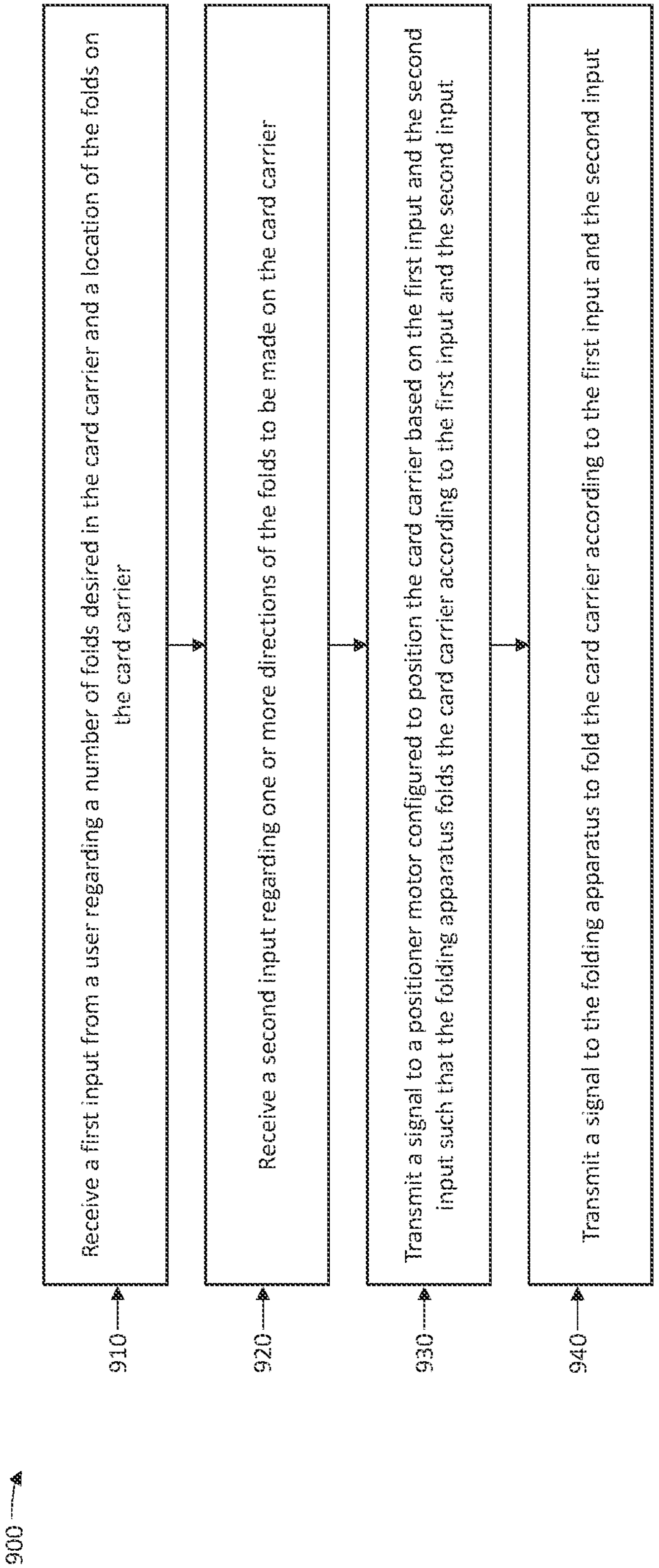
FIG. 9 is an example flowchart illustrating a process for folding a card carrier using the folding apparatus and positioner of FIG. 7, in accordance with one or more embodiments.

FIG. 9 is an example flowchart 900 illustrating a process for folding a carrier using the folder 180 and positioner 185 of FIG. 7. Additional, fewer, or different operations may be performed in the method, depending on the embodiment. Further, the operations may be performed in the order shown, concurrently, or in a different order. The operations illustrated in the process 900 may be performed by a controller of a card attachment system such as the card attachment system 100 described herein. An example of the controller is shown in FIG. 13.

At 910, the controller may receive a first input from a user regarding a number of folds desired in the card carrier and a location of the folds on the card carrier. In some embodiments, the controller may receive the first input based on a type of the card carrier. In some embodiments, the card carrier is scored at the location of the folds on the card carrier. In some embodiments, the number of folds desired in the card carrier is zero, such that the card carrier is not to be folded by a folding apparatus.

In some embodiments, the first input includes a total number of folds desired in the card carrier and a location of the folds on the card carrier. One or more folds of the total number of folds may be made by a second folding apparatus before a card is attached to the card carrier. The folding apparatus may make one or more final folds of the total number of folds after the card is attached to the card carrier. The controller may determine which folds have been made in the card carrier and assign the remaining folds of the total number of folds to the folding apparatus. In other embodiments, the first input includes a number of folds yet to be made in the card carrier. One or more other folds may be made by the second folding apparatus before the card is attached to the card carrier. The first input may include only those folds which are to be made by the folding apparatus, not the folds made by the second folding apparatus.

At 920, the controller may receive a second input regarding one or more directions of the folds to be made on the card carrier. For example, in some embodiments, the second input may dictate that a fold is to be made in the card carrier from a first edge of the card carrier to a second edge of the card carrier.

At 930, the controller may transmit a signal to a positioner motor configured to position the card carrier based on the first input and the second input such that a folding apparatus folds the card carrier according to the first input and the second input. The positioner motor may position the card carrier such that the folding apparatus makes the number of folds desired in the card carrier in the location of the folds on the card carrier in the directions of the folds on the card carrier, according to the first and second inputs. In some embodiments, the folding apparatus may be one or more plow folders and the positioner motor may position the card carrier before the one or more plow folders such that the plow folders fold the card carrier according to the first and second inputs.

In some embodiments, the positioner motor may position the card carrier such that the card carrier is not folded. The controller may determine based on the first and second inputs that the number of folds desired in the card carrier is zero. The controller may transmit a signal to the positioner motor to position the card carrier such that the folding apparatus does not fold the card carrier. For example, in some embodiments, the card carrier may be a box product which does not require additional folds. The controller may transmit a signal to the positioner motor to position the box product to the side of the folding apparatus such that the box product is not folded by the folding apparatus. In some embodiments, the controller may determine, using one or more sensors, that the card carrier does not have a card attached. The controller may transmit a signal to the position motor based on the lack of card attached to the card carrier to position the card carrier in a reject bin. The reject bin may allow the card carrier lacking an attached card to be handled by an operator of the card attachment system.

At 940 the controller may transmit a signal to the folding apparatus to fold the card carrier according to the first input and the second input. In some embodiments, the folding apparatus may be one or more plow folders and the one or more plow folders may fold the card carrier according to the first input and the second input.

Figure 10:
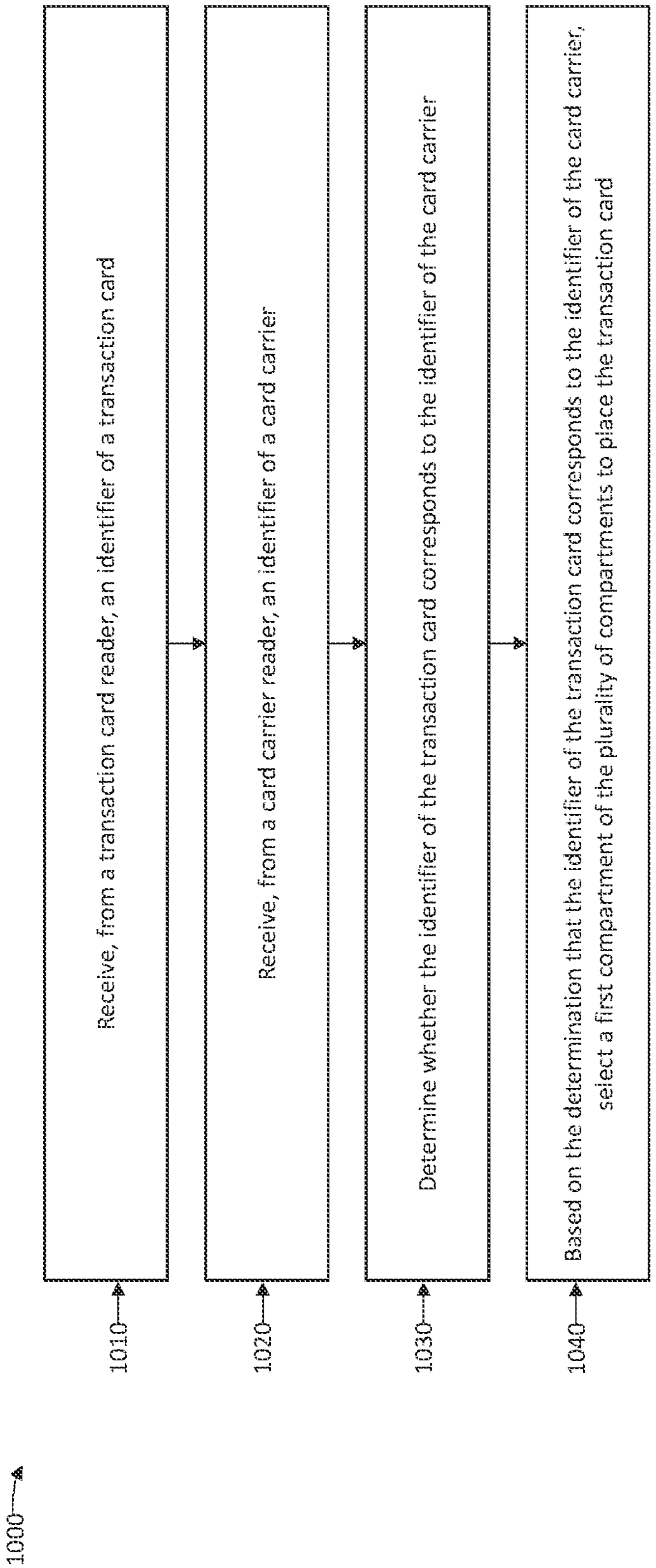
FIG. 10 is an example flowchart illustrating a process for placing a card in a compartment of the card reader and stager of FIG. 5, in accordance with one or more embodiments.

FIG. 10 is an example flowchart 1000 illustrating a process for placing a card in a compartment of a stager.

Additional, fewer, or different operations may be performed in the method, depending on the embodiment. Further, the operations may be performed in the order shown, concurrently, or in a different order. The operations illustrated in the process 1000 may be performed by a controller of a card attachment system such as the card attachment system 100 described herein. An example of the controller is shown in FIG. 13.

At 1010, the controller may receive, from a transaction card reader, an identifier of a transaction card. The transaction card reader may be similar to the card reader 150 of the card attachment system 100 described herein. The transaction card reader may include one or more sensors for reading the transaction card. The transaction card may be a credit, debit, or gift card. The transaction card reader may read the identifier of the transaction card by sensing a magnetic strip of the transaction card, a chip of the transaction card, a near-field communication (NFC) chip of the transaction card, or a radio frequency identification (RFID) chip of the transaction card. The controller may verify the identifier of the transaction card with an identifier in a transaction card database.

At 1020, the controller may receive, from a card carrier reader, an identifier of a card carrier. The card carrier reader may include one or more sensors configured to read the identifier of the card carrier. In some embodiments, the card carrier reader may be integrated into a conveyor or transporter belt which transports the carrier towards a gantry where the card is to be attached to the card carrier. In other embodiments, the card carrier reader is integrated into a folding apparatus which makes one or more folds in the card carrier before the card is attached to the card carrier. In yet other embodiments, the card carrier reader includes one or more sensors which read the identifier of the card carrier as the card carrier is carried by the conveyor or transporter belt as the card carrier is transported towards the gantry. The controller may verify the identifier of the card carrier with an identifier in a card carrier database. In some embodiments, the card carrier database may be the same as the transaction card database. In some embodiments, the identifier of the transaction card may be the same as the identifier of the card carrier.

At 1030, the controller may determine whether the identifier of the transaction card corresponds to the identifier of the card carrier. In some embodiments, the controller may compare the identifier of the transaction card with a known identifier associated with the identifier of the card carrier. In other embodiments, the controller may compare the identifier of the card carrier with a known identifier associated with the identifier of the transaction card. In some embodiments, the controller may determine whether the identifier of the transaction card corresponds to the identifier of the card carrier based on whether the identifier of the transaction card matches or is the same as the identifier of the card carrier. In some embodiments, the controller may determine whether the identifier of the card carrier and the identifier of the transaction card are associated with a third identifier. For example, in some embodiments, the transaction card may be a credit card for John Doe and the card carrier may be a letter accompanying the transaction card, the letter being addressed to John Doe. Based on the credit card identifier and the letter identifier being associated with John Doe, the controller may determine that the credit card identifier corresponds to the letter identifier.

At 1040 the controller may, based on the determination that the identifier of the transaction card corresponds to the identifier of the card carrier, select a first compartment of a plurality of compartments of a stager of a card attachment system in which to place the transaction card. The stager may be similar to the stager 160 of the card attachment system 100 discussed herein. The controller may transmit a signal to the card reader to place the transaction card in the compartment. In some embodiments, the stager may move such that the compartment is before the card reader such that the card reader can place the transaction card in the compartment. The transaction card may be placed in the compartment so that an arm of the card attachment system can pick up the transaction card and attach it to the card carrier. If the identifier of the transaction card does not match the identifier of the card carrier, the transaction card may be placed in a hard reject area.

Figure 11:
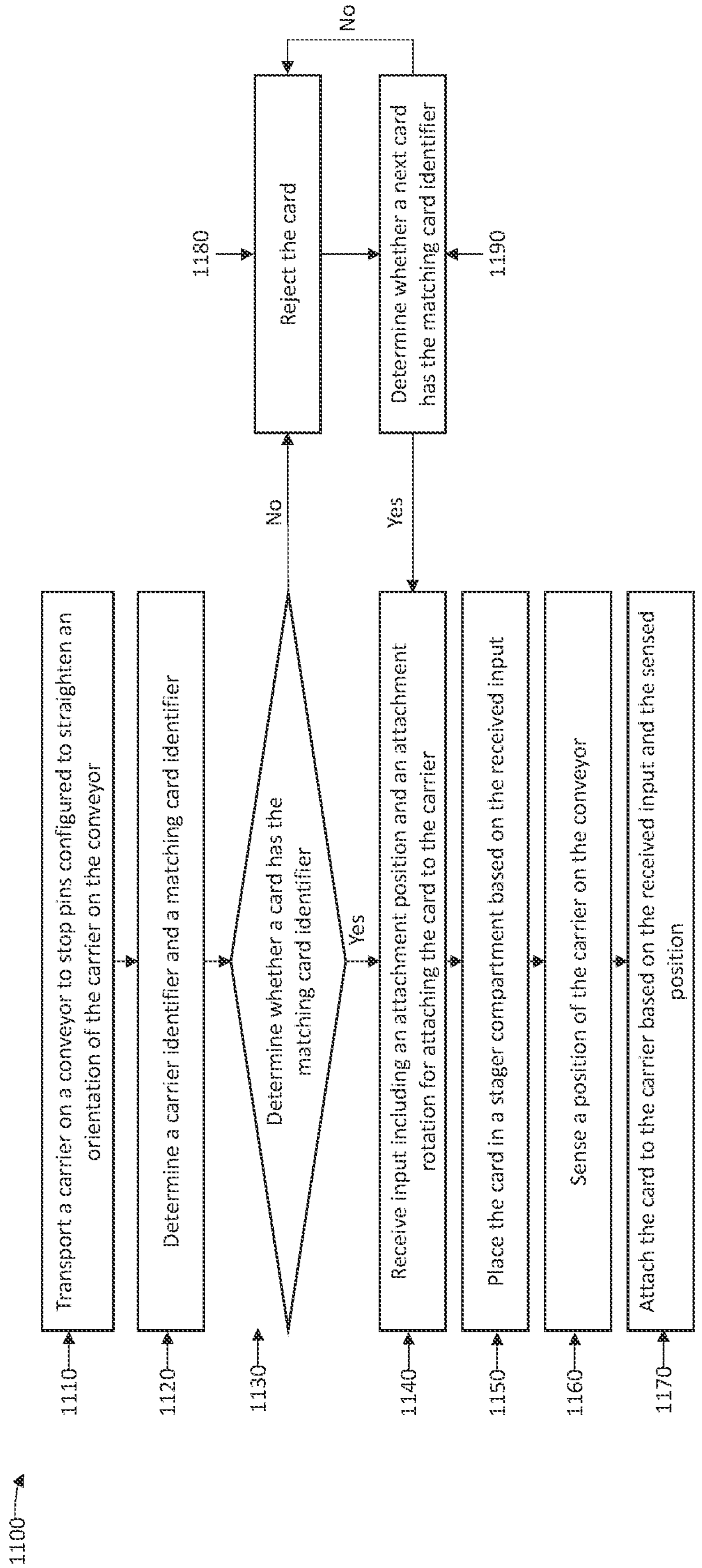
FIG. 11 is an example flowchart illustrating a process for attaching a card to a carrier using the one or more arms of the card attachment system of FIG. 1, in accordance with one or more embodiments.

FIG. 11 is an example flowchart 1100 illustrating a process for attaching a card to a card carrier. Additional, fewer, or different operations may be performed in the method, depending on the embodiment. Further, the operations may be performed in the order shown, concurrently, or in a different order. The operations illustrated in the process 1100 may be performed by the card attachment system 100 described herein. An example of the controller is shown in FIG. 13.

At 1110, a card carrier is transported on a conveyor to stop pins configured to straighten an orientation of the card carrier on the conveyor. The stop pins may extend from the conveyor to stop the card carrier as it is carried toward a gantry. The stop pins may straighten the card carrier relative to the conveyor such that a leading edge of the card carrier is perpendicular to a direction of motion of the conveyor.

At 1120, a controller of a card attachment system determines a carrier identifier and a matching card identifier. The controller may determine the carrier identifier using one or more sensors in the conveyor configured to read the carrier identifier. The controller may determine the matching card identifier based on the matching card identifier being the same as or associated with the carrier identifier.

At 1130, the controller determines whether a card has the matching card identifier. The controller may determine a card identifier of the card using a card reader. The controller may determine whether card identifier is the matching card identifier.

At 1140, if the controller determines that the card has the matching card identifier, the controller receives input including an attachment position and an attachment rotation for attaching the card to the card carrier.

At 1150, the controller may cause the card to be placed in a stager compartment based on the received input. In some embodiments, the controller may cause a card reader to place the card in the stager compartment. The controller may cause the card to be placed in the compartment as opposed to a second compartment based on a number of cards to be attached to the card carrier and the relative positions of cards to be placed on the card carrier. For example, in some embodiments, if a first card is to be attached on a left side of the card carrier and a second card is to be placed on a right side of the card carrier, the first card may be placed in a first compartment which is left of a second compartment in which the second card is placed. The placement of the first card in the first compartment and the second card in the second compartment allows arms of a gantry to pick up the first and second cards and place them on the left and right sides of the card carrier, respectively.

At 1160, the controller may sense, using one or more sensors, a position of the card carrier on the conveyor. The controller may determine an offset from a default position of the card carrier on the conveyor which offset is used to adjust the placement of the card on the card carrier.

At 1170, the controller may cause the card to be attached to the card carrier based on the received input and the sensed position. The controller may cause an arm of a gantry to pick up the card from the compartment of the stager and place the card on the attachment position in the attachment orientation, as adjusted by the sensed position of the card carrier.

At 1180, if the controller determines that the card does not have the matching card identifier, the controller rejects the card. The controller may soft reject the card and cause the card to be placed by the first arm of the gantry in a soft reject area. The card may sit in the soft reject area until its corresponding card carrier approaches the gantry, at which point steps 1140-1170 are performed with the card, with the card being picked up by the first arm from the soft reject area instead of from the compartment of the stager. When the controller soft rejects the card, the controller may cause the card to be placed in the compartment of the stager and picked up from the compartment by the first arm and placed in the soft reject area. The controller may hard reject the card and cause the card to be placed in a hard reject area. The controller may cause the card to be placed in a reject compartment of the stager. The stager may move such that the card is ejected from the reject compartment and enters the hard reject area. The card may be retrieved from the hard reject area by an operator of the card attachment system.

At 1190 the controller may determine whether a next card has the matching card identifier. If the next card does not have the matching card identifier, the next card is rejected at 1180 and steps 1190 and 1180 are repeated. If the next card has the matching card identifier, steps 1140 and 1170 are performed with the next card.

Figure 12:
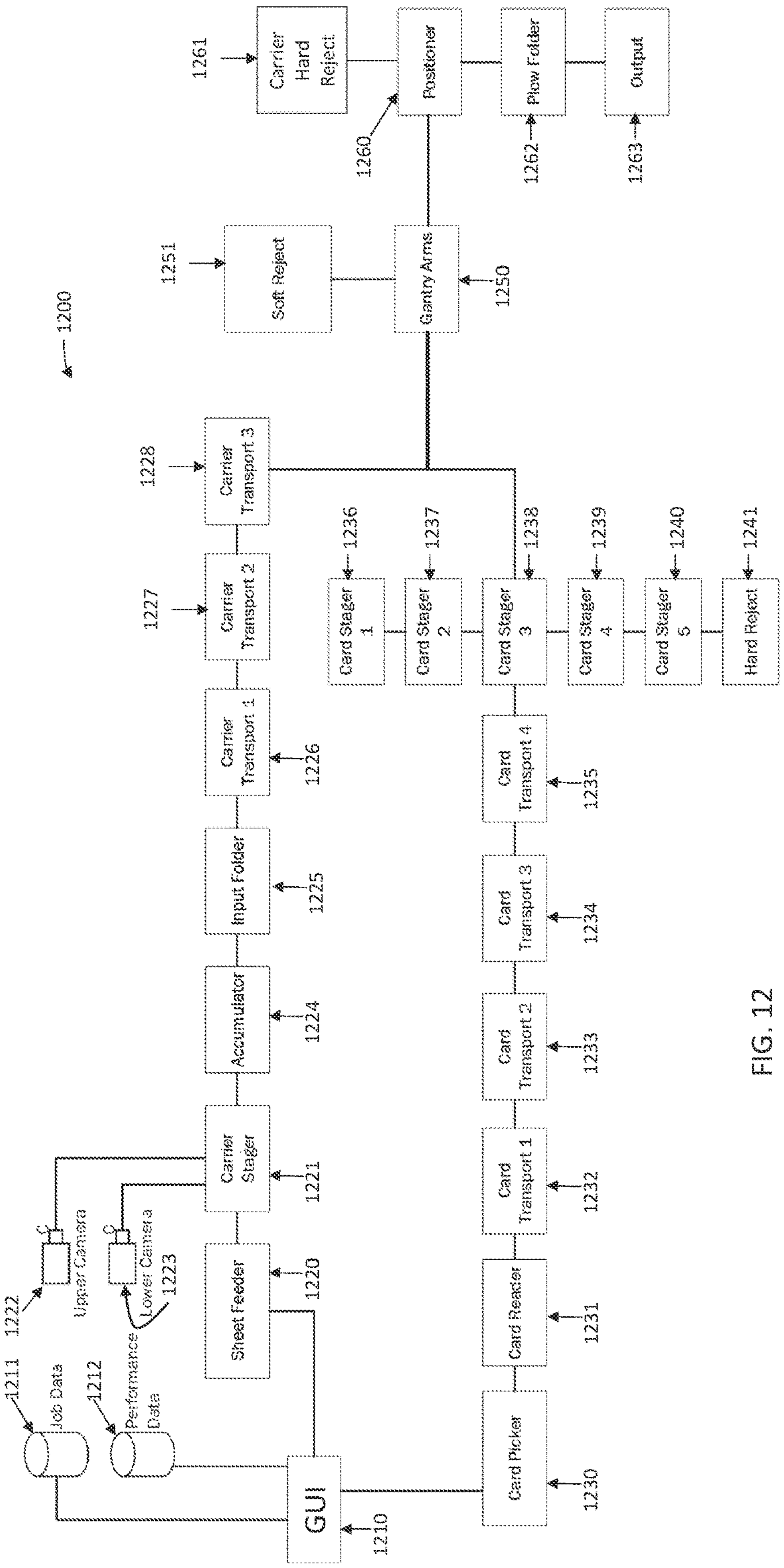
FIG. 12 is an example block diagram illustrating a card attachment system such as the card attachment system of FIG. 1, in accordance with one or more embodiments.

FIG. 12 is an example block diagram illustrating a card attachment system 1200, in accordance with one or more embodiments. The card attachment system 1200 has the same elements as the card attachment system 100, so those elements are not described again. A GUI 1210 may provide for user input and interaction with the card attachment system 1200. The GUI 1210 may receive job data 1211 and performance data 1212. The job data 1211 may include what tasks are to be performed, such as which cards are to be attached to which card carriers, and in which locations and orientations on the card carriers. The job data 1211 may also include folds which are to be made in the card carriers. Performance data 1212 may include information on how the tasks are being performed, such as a progress in completing the tasks, an accuracy of completing the tasks, and system errors. The job data 1211 and performance data 1212 may be displayed on the GUI 1210. The GUI 1210 may be coupled to a controller (shown in FIG. 13). The GUI 1210 and/or the controller may authenticate a user to allow the user to run the card attachment system 1200. The GUI 1210 and/or the controller may decrypt the job data 1211.

The GUI 1210 and/or the controller may send commands to a sheet feeder 1220. The sheet feeder 1220 may feed card carriers to a carrier stager 1221. The card stager 1221 is similar to the stager 160 of FIG. 1. The carrier stager 1221 may receive data from an upper camera 1222 and a lower camera 1223 to determine an identifier of a card carrier and to determine that a single card carrier is present. If more than one card carrier is present, a card may be incorrectly attached to the card carrier. The carrier stager 1221 may validate, based on the identifier of the card carrier, that the card carrier is part of the current task, based on the job data. The carrier stager 1221 may generate conveying data based on the job data which includes card account data, card placement, card rotation, and card quantity of the card or cards to be attached to the card carrier. The carrier stager 1221 may deliver card carriers to an accumulator 1224. The accumulator 1224 may collect batches of card carriers based on the job data and identifiers of the card carriers and deliver the batches of card carriers to an input folder 1225 (e.g., the folder 181 of FIG. 6). The input folder 1225 may make one or more folds in the card carriers based on the job data. The input folder 1225 may deliver the card carriers to a first carrier transport section 1226. The first carrier transport section 1226 may be a conveyor belt (e.g., the conveyor 140 of FIG. 1) which transports the card carriers towards a gantry (e.g., the gantry 110). The first carrier transport section 1226 may include stop pins configured to straighten a card carrier on the first carrier transport section 1226. The stop pins may extend through the first carrier transport section 1226 to stop the card carrier as it is transported towards the gantry, straightening the card carrier relative to the stop pins. The first carrier transport section 1226 may deliver the card carriers to a second carrier transport section 1227. The second carrier transport section 1227 may include a sensor (e.g., the sensor 190) which determines a position a card carrier on the second carrier transport section to calculate an offset. The offset may be used to precisely place a card on the card carrier. The second carrier transport section 1227 may deliver the card carriers to a third carrier transport section 1228. The third carrier transport section may bring the card carriers to the gantry for attachment of cards and may position the card carriers for the attachment of the cards based on the job data. In some embodiments, the carrier transport may include more or fewer carrier transport sections.

The GUI 1210 and/or the controller may send commands to a card picker 1230 (e.g., the card picker . . . ). The card picker 1230 may, based on the job data, retrieve cards for attachment to the card carriers. The card picker 1230 may deliver the cards to a card reader 1231 (e.g., the card reader 150) which determines a card identifier of each card. The card reader 1231 may generate conveying data for each. The card reader 1231 may deliver the cards to a first card transport section 1232 which may deliver the cards to a second card transport section 1233. The second card transport section 1233 may capture a position of each card for tape placement and deliver the cards to a third card transport section 1234 which may apply tape to a back of each card. The third card transport section 1234 may deliver the cards to a fourth card transport section 1235 which may deliver the cards to a card stager (e.g., the card stager 160). The first, second, third, and fourth card transport sections 1232, 1233, 1234, 1235 may provide a buffer to the controller to match the cards to carriers, determine that one or more of the cards should be placed in a soft reject area 1251, or determine that one or more of the cards should be placed in a hard reject area 1241, as discussed herein. In some embodiments, the card reader 1231 may deliver the cards directly to the card stager. In other embodiments, the card reader 1231 may deliver the cards to the card stager using more or fewer card transport sections. The card stager may include a first card stager section 1236, a second card stager section 1237, a third card stager section 1238, a fourth card stager section 1239, and a fifth card stager section 1240. In some embodiments, the card stager may include more or fewer card stager sections. The fourth card transport section 1235 may deliver each card to a section of the card stager based on the job data. In some embodiments, the fourth card transport section 1235 is static and the card stager sections move in order for each card to be delivered to a correct card stager section. The card stager may also include the hard reject area 1241. A hard reject requires a rejected card carrier to be retrieved by an operator of the card attachment system 1200. A card may be delivered to the hard reject area 1241 based on the card being associated with a card carrier that has already passed the gantry, that was not delivered to the gantry, or that is otherwise unavailable. Cards in the hard reject area 1241 may be retrieved by an operator of the card attachment system 1200. The gantry arms 1250 may retrieve cards from the card stager and attach them to card carriers on the third carrier transport section 1228. The card stager may shift the card stager sections 1236-1240 left or right to facilitate retrieval by the gantry arms 1250 (e.g., the one or more arms 120) of the cards. The gantry arms may place cards in the soft reject area 1251 (e.g., the soft reject area 170) based on the cards being associated with card carriers which have not yet been delivered to the third carrier transport section 1228. The gantry arms 1250 may retrieve the cards from the soft reject area 1251 and place them on their respective card carriers once the respective card carriers reach the third carrier transport section 1228.

Card carriers may be delivered by the third carrier transport section 1228 to a positioner 1260 (e.g., the positioner 185). The positioner 1260 may deliver card carriers to a carrier hard reject area 1261 based on the card carriers not having attached cards or the cards being attached incorrectly to the card carriers. The positioner 1260 may position card carriers with attached cards based on job data such that a plow folder 1262 (e.g., the folder 180) makes one or more folds in the card carriers with attached cards in accordance with the job data. The card carriers with attached cards may pass through the plow folder 1262 to an output 1263 which verifies that the cards are attached to the card carriers using a plurality of sensors. The card attachment system 1200 may include a plurality of sensors for determining identifiers of cards, identifiers of card carriers, and for conveying the cards and card carriers throughout the card attachment system 1200.

FIG. 13 is an example block diagram of a computing system 1300 implementing a card attachment application, in accordance with one or more embodiments. The computing system 1300 includes a host device 1310. The host device 1310 includes a memory device 1316. In other embodiments, the memory device 1316 associated with the host device 1310 is a separate device that is communicatively coupled to the host device 1310 instead. The host device 1310 may be configured to receive input from one or more input devices 1305 and provide output to one or more output devices 1330. The host device 1310 may be configured to communicate with the input devices 1305 and the output devices 1330 via appropriate interfaces or channels 1320A and 1320B, respectively. The computing system 1300 may be implemented in a variety of computing devices such as computers (e.g., desktop, laptop, etc.), tablets, personal digital assistants, mobile devices, wearable computing devices such as smart watches, other handheld or portable devices, or any other computing unit suitable for performing operations described herein using the host device 1310.

Further, some or all of the features described in the present disclosure may be implemented on a client device, a server device, or a cloud/distributed computing environment, or a combination thereof. Additionally, unless otherwise indicated, functions described herein as being performed by a computing device (e.g., the computing system 1300) may be implemented by multiple computing devices in a distributed environment, and vice versa. In some embodiments, the computing system 1300 or at least some of the features described herein may be implemented in an in-vehicle system (e.g., tablet) that may be configured to perform at least some of the operations described herein and report those out to a server while, in other embodiments, the server may perform the operations.

The input devices 1305 may include any of a variety of input technologies such as a keyboard, stylus, touch screen, mouse, conveyor ball, keypad, microphone, voice recognition, motion recognition, remote controllers, input ports, one or more buttons, dials, joysticks, camera, and any other input peripheral that is associated with the host device 1310 and that allows an external source, such as a user, to enter information (e.g., data) into the host device and send instructions to the host device 1310. Similarly, the output devices 1330 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 1310. The “data” that is either input into the host device 1310 and/or output from the host device may include any of a variety of textual data, graphical data, video data, image data, sound data, position data, sensor data, combinations thereof, or other types of analog and/or digital data that is suitable for processing using the computing system 1300.

The host device 1310 may include one or more Central Processing Unit (“CPU”) cores or processors 1312A-1312N that may be configured to execute instructions for running one or more applications associated with the host device 1310. In some embodiments, the instructions and data needed to run the one or more applications may be stored within the memory device 1316. The host device 1310 may also be configured to store the results of running the one or more applications within the memory device 1316. One such application on the host device 1310 may include a card attachment application 1314. The card attachment application 1314 may be executed by one or more of the CPU cores 1312A-1312N. The instructions to execute the card attachment application 1314 may be stored within the memory device 1316. Operations performed by the card attachment application 1314 in conjunction with a card attachment system described herein. Thus, the host device 1310 may be configured to request the memory device 1316 to perform a variety of operations. For example, in some embodiments, the host device 1310 may request the memory device 1316 to read data, write data, update or delete data, and/or perform management or other operations.

To facilitate communication with the memory device 1316, the memory device 1316 may include or be associated with a memory controller 1318. Although the memory controller 1318 is shown as being part of the memory device 1316, in some embodiments, the memory controller 1318 may instead be part of another element of the computing system 1300 and operatively associated with the memory device 1316. For example, in some embodiments, when the memory device 1316 is a separate device from the host device 1310, the memory controller 1318 may be configured as a logical block or circuitry that receives instructions from the host device 1310 and performs operations in accordance with those instructions. For example, in some embodiments, when the execution of the card attachment application 1314 is desired, the host device 1310 may send a request to the memory controller 1318. The memory controller 1318 may read the instructions associated with the card attachment application 1314 that are stored within the memory device 1316, and send those instructions back to the host device 1310. Continuing with the example embodiment of the memory device 1316 being a separate device from the host device 1310, those instructions may be temporarily stored within a memory on the host device 1310. One or more of the CPU cores 1312A-1312N may then execute those instructions by performing one or more operations called for by those instructions of the card attachment application 1314.

The memory device 1316 may include one or more memory circuits 1317 that store data and instructions. The memory circuits 1317 may be any of a variety of memory types, including a variety of volatile memories, non-volatile memories, or a combination thereof. For example, in some embodiments, in some embodiments, one or more of the memory circuits 1317 or portions thereof may include NAND flash memory cores. In other embodiments, one or more of the memory circuits 1317 or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D (Point memory cores, ferroelectric random-access memory (FeRAM) cores, and other types of memory cores that are suitable for use within the memory device 1316. In some embodiments, one or more of the memory circuits 1317 or portions thereof may be configured as other types of storage class memory ("SCM"). Generally speaking, the memory circuits 1317 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the computing system 1300 are shown and described in FIG. 13. However, the computing system 1300 may include other components such as various batteries and power sources, networking interfaces, routers, switches, external memory systems, controllers, cameras, barcode readers, safety circuits, etc. Generally speaking, the computing system 1300 may include any of a variety of hardware, software, and/or firmware components that are needed or considered desirable in performing the functions described herein. Similarly, the host device 1310, the input devices 1305, the output devices 1330, and the memory device 1316, including the memory controller 1318 and the memory circuits 1317, may include hardware, software, and/or firmware components that are considered necessary or desirable in performing the functions described herein. In addition, in certain embodiments, the memory device 1316 may integrate some or all of the components of the host device 1310, including, for example, the CPU cores 1312A-1312N, and the CPU cores may be configured to execute the card attachment application 1314, as described herein.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality if effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The invention claimed is:

1. A system comprising:

a folding apparatus configured to fold a card carrier for affixing a transaction card to the card carrier; and one or more non-transitory computer-readable media comprising computer-readable instructions stored thereon which, when executed by the one or more processors of the system, cause the one or more processors to:

receive a first input from a user regarding a number of folds desired in the card carrier and a location of the folds on the card carrier;

receive a second input regarding one or more directions of the folds to be made on the card carrier; and transmit a signal to a positioner motor configured to position the card carrier based on the first input and the second input such that the folding apparatus folds the card carrier according to the first input and the second input.

2. The system of claim 1, wherein the card carrier is scored in a location where the folds on the card carrier are to be made.

3. The system of claim 1, wherein the card carrier is a booklet, and wherein the positioner motor is further configured to position the card carrier such that the folding apparatus does not fold the card carrier.

4. The system of claim 1, wherein a second folding apparatus makes one or more folds in the card carrier before the transaction card is attached to the card carrier.

5. The system of claim 4, wherein the second folding apparatus makes the one or more folds in the card carrier equal to the number of folds desired in the card carrier minus one, and wherein the folding apparatus makes a final fold in the card carrier.

6. The system of claim 1, further comprising one or more sensors configured to determine a position of the card carrier and an identifier of the card carrier.

7. The system of claim 6, wherein positioning the card carrier based on the first input and the second input comprises verifying a position of the card carrier using the one or more sensors.

8. The system of claim 1, further comprising a conveyor configured to transport the card carrier that has been folded by the folding apparatus to a gantry for affixing the transaction card to the card carrier, wherein the gantry comprises an arm that affixes the transaction card to the card carrier as the card carrier moves on the conveyor.

9. The system of claim 8, wherein the gantry is configured to move the arm in a first direction that is perpendicular to a direction of movement of the card carrier on the conveyor and a second direction that is perpendicular to the first direction and the direction of movement of the card carrier on the conveyor to affix the transaction card to the card carrier.

10. The system of claim 9, wherein the gantry is further configured to rotate the arm in a third direction that is perpendicular to the first direction and the second direction to affix the transaction card to the card carrier.

11. The system of claim 1, wherein the card carrier comprises one of a paper, a booklet, or a box product.

12. The system of claim 1, wherein the transaction card comprises one of a credit card, a debit card, or a gift card.

13. A non-transitory, computer-readable medium comprising computer- readable instructions which, when executed by one or more processors of a folding apparatus configured to fold a card carrier for affixing a transaction card to the card carrier, cause the processor to:

receive a first input from a user regarding a number of folds desired in the card carrier and a location of folds on the card carrier;

receive a second input regarding one or more directions of the folds to be made on the card carrier; and transmit a signal to a positioner motor configured to position the card carrier based on the first input and the second input such that the folding apparatus folds the card carrier according to the first input and the second input.

14. The non-transitory, computer-readable medium of claim 13, wherein the instructions further cause the one or more processors to transmit a signal to a second folding apparatus to make one or more folds in the card carrier equal to the number of folds desired in the card carrier minus one before the transaction card is attached to the card carrier, and wherein the folding apparatus makes a final fold in the card carrier.

15. The non-transitory, computer-readable medium of claim 13, wherein the instructions further cause the one or more processors to:

receive, from one or more sensors, a position of the card carrier and an identifier of the card carrier; and modify the signal transmitted to the positioner motor based on verifying a position of the card carrier using the received position of the card carrier.

16. The non-transitory, computer-readable medium of claim 13, wherein the instructions further cause the one or more processors to:

actuate a conveyor configured to transport the card carrier that has been folded by the folding apparatus to a gantry for affixing the transaction card to the card carrier, wherein the gantry comprises an arm that affixes the transaction card to the card carrier as the card carrier moves on the conveyor; and move the arm in a first direction that is perpendicular to a direction of movement of the card carrier on the conveyor and a second direction that is perpendicular to the first direction and the direction of movement of the card carrier on the conveyor to affix the transaction card to the card carrier, wherein the instructions further cause the one or more processors to rotate the arm in a third direction that is perpendicular to the first direction and the second direction to affix the transaction card to the card carrier.

17. A method comprising:

receiving a first input from a user regarding a number of folds desired in a card carrier and a location of folds on the card carrier by a folding apparatus configured to fold the card carrier for affixing a transaction card to the card carrier;

receiving a second input regarding one or more directions of the folds to be made on the card carrier; and transmitting a signal to a positioner motor configured to position the card carrier based on the first input and the second input such that the folding apparatus folds the card carrier according to the first input and the second input.

18. The method of claim 17, further comprising transmitting a signal to a second folding apparatus to make one or more folds in the card carrier equal to the number of folds desired in the card carrier minus one before the transaction card is attached to the card carrier, and wherein the folding apparatus makes a final fold in the card carrier.

19. The method of claim 17, further comprising:

receiving, from one or more sensors, a position of the card carrier and an identifier of the card carrier; and modifying the signal transmitted to the positioner motor based on verifying a position of the card carrier using the received position of the card carrier.

20. The method of claim 17, further comprising:

actuating a conveyor configured to transport the card carrier that has been folded by the folding apparatus to a gantry for affixing the transaction card to the card carrier, wherein the gantry comprises an arm that affixes the transaction card to the card carrier as the card carrier moves on the conveyor;

moving the arm in a first direction that is perpendicular to a direction of movement of the card carrier on the conveyor and a second direction that is perpendicular to the first direction and the direction of movement of the card carrier on the conveyor to affix the transaction card to the card carrier;

rotating the arm in a third direction that is perpendicular to the first direction and the second direction to affix the transaction card to the card carrier in a desired orientation.

* * * * *